(12) United States Patent
Kaminski

(10) Patent No.: US 8,576,989 B2
(45) Date of Patent: Nov. 5, 2013

(54) BEAM FORMING APPARATUS

(75) Inventor: Joseph W. Kaminski, Campbell, CA (US)

(73) Assignee: Rapiscan Systems, Inc., Torrance, CA (US)

( * ) Notice: Subject to any disclaimer, the term of this patent is extended or adjusted under 35 U.S.C. 154(b) by 279 days.

(21) Appl. No.: 13/047,657

(22) Filed: Mar. 14, 2011

(65) Prior Publication Data
US 2011/0293072 A1  Dec. 1, 2011

Related U.S. Application Data

(60) Provisional application No. 61/313,772, filed on Mar. 14, 2010.

(51) Int. Cl.
*G21K 1/04* (2006.01)

(52) U.S. Cl.
USPC ............................................................ 378/160

(58) Field of Classification Search
USPC ................................................................ 378/160
See application file for complete search history.

(56) References Cited

U.S. PATENT DOCUMENTS

| | | |
|---|---|---|
| 3,678,278 A | 7/1972 | Peil |
| 3,780,291 A | 12/1973 | Stein et al. |
| 3,790,799 A | 2/1974 | Stein et al. |
| 3,843,881 A | 10/1974 | Barton, Jr. et al. |
| 3,884,816 A | 5/1975 | Takahashi |
| RE28,544 E | 9/1975 | Stein et al. |
| 3,919,467 A | 11/1975 | Peugeot |
| 3,924,064 A | 12/1975 | Nomura et al. |
| 3,961,186 A | 6/1976 | Leunbach |
| 3,971,948 A | 7/1976 | Pfeiler et al. |
| 3,990,175 A | 11/1976 | Conway et al. |
| 4,008,400 A | 2/1977 | Brunnett et al. |
| 4,020,346 A | 4/1977 | Dennis |
| 4,031,545 A | 6/1977 | Stein et al. |
| 4,047,035 A | 9/1977 | Dennhoven et al. |
| 4,064,440 A | 12/1977 | Roder |

(Continued)

FOREIGN PATENT DOCUMENTS

| | | |
|---|---|---|
| EP | 0261984 A2 | 3/1988 |
| WO | WO 2009/006044 | 1/2009 |

(Continued)

OTHER PUBLICATIONS

ANSI, Radiation Safety for Personnel Security Screening Systems ing X-Rays, Apr. 3, 2002.

(Continued)

*Primary Examiner* — Courtney Thomas
(74) *Attorney, Agent, or Firm* — Novel IP

(57) ABSTRACT

The present specification discloses a beam chopping apparatus, and more specifically, a helical shutter for an electron beam system that is employed in radiation-based scanning systems, and more specifically, a beam chopping apparatus that allows for variability in both velocity and beam spot size by modifying the physical characteristics or geometry of the beam chopper apparatus. The present specification also discloses a beam chopping apparatus which provides a vertically moving beam spot with substantially constant size and velocity to allow for substantially equal illumination of the target. In addition, the present specification is a beam chopping apparatus that is lightweight and does not cause an X-ray source assembly employing the beam chopper to become heavy and difficult to deploy.

18 Claims, 18 Drawing Sheets

(56) References Cited

U.S. PATENT DOCUMENTS

| | | |
|---|---|---|
| 4,070,576 A | 1/1978 | Cobb |
| 4,107,532 A | 8/1978 | MaCovski |
| 4,112,301 A | 9/1978 | Annis et al. |
| 4,139,771 A | 2/1979 | Dennhoven et al. |
| 4,160,165 A | 7/1979 | McCombs et al. |
| 4,179,100 A | 12/1979 | Sashin et al. |
| 4,196,352 A | 4/1980 | Berninger et al. |
| 4,200,800 A | 4/1980 | Swift |
| 4,228,353 A | 10/1980 | Johnson |
| 4,228,357 A | 10/1980 | Annis |
| 4,242,583 A | 12/1980 | Annis et al. |
| 4,242,588 A | 12/1980 | Silk et al. |
| 4,260,898 A | 4/1981 | Annis |
| 4,298,800 A | 11/1981 | Goldman |
| 4,303,830 A | 12/1981 | Heinzelmann et al. |
| 4,342,914 A | 8/1982 | Bjorkholm |
| 4,349,739 A | 9/1982 | Annis |
| 4,366,382 A | 12/1982 | Kotowski |
| 4,366,576 A | 12/1982 | Annis |
| 4,380,817 A | 4/1983 | Harding et al. |
| 4,389,729 A | 6/1983 | Stein |
| 4,414,682 A | 11/1983 | Annis et al. |
| 4,422,177 A | 12/1983 | Mastronardi et al. |
| 4,426,721 A | 1/1984 | Wang |
| 4,454,605 A | 6/1984 | DeLucia |
| 4,472,822 A | 9/1984 | Swift |
| 4,503,332 A | 3/1985 | Annis |
| 4,514,691 A | 4/1985 | De Los Santos et al. |
| 4,525,854 A | 6/1985 | Molbert et al. |
| 4,535,245 A | 8/1985 | Zonneveld et al. |
| 4,549,307 A | 10/1985 | Macovski |
| 4,578,806 A | 3/1986 | Grass et al. |
| 4,586,441 A | 5/1986 | Zekich |
| 4,598,415 A | 7/1986 | Luccio et al. |
| 4,672,837 A | 6/1987 | Cottrell, Jr. |
| 4,692,937 A | 9/1987 | Sashin et al. |
| 4,711,994 A | 12/1987 | Greenberg |
| 4,736,401 A | 4/1988 | Donges et al. |
| 4,745,631 A | 5/1988 | Paolini |
| 4,756,015 A | 7/1988 | Doenges et al. |
| 4,759,047 A | 7/1988 | Donges et al. |
| 4,768,214 A | 8/1988 | Bjorkholm |
| 4,783,794 A | 11/1988 | Dietrich |
| 4,799,247 A | 1/1989 | Annis et al. |
| 4,807,637 A | 2/1989 | Bjorkholm |
| 4,809,312 A | 2/1989 | Annis |
| 4,817,121 A | 3/1989 | Shimizu et al. |
| 4,819,256 A | 4/1989 | Annis et al. |
| 4,821,023 A | 4/1989 | Parks |
| 4,825,454 A | 4/1989 | Annis et al. |
| 4,839,913 A | 6/1989 | Annis et al. |
| 4,841,555 A | 6/1989 | Doi et al. |
| 4,845,769 A | 7/1989 | Burstein et al. |
| 4,864,142 A | 9/1989 | Gomberg |
| 4,870,670 A | 9/1989 | Geus |
| 4,884,289 A | 11/1989 | Glockmann et al. |
| 4,890,310 A | 12/1989 | Umetani et al. |
| 4,893,015 A | 1/1990 | Kubierschky et al. |
| 4,894,619 A | 1/1990 | Leinonen et al. |
| 4,899,283 A | 2/1990 | Annis |
| 4,961,214 A | 10/1990 | Van Endschot et al. |
| 4,974,247 A | 11/1990 | Friddell |
| 4,979,137 A | 12/1990 | Gerstenfeld et al. |
| 4,995,066 A | 2/1991 | Harding et al. |
| 5,007,072 A | 4/1991 | Jenkins et al. |
| 5,022,062 A | 6/1991 | Annis |
| 5,033,073 A | 7/1991 | Friddell |
| 5,038,370 A | 8/1991 | Harding et al. |
| 5,039,981 A | 8/1991 | Rodriguez |
| 5,044,002 A | 8/1991 | Stein |
| 5,084,619 A | 1/1992 | Pfeiler et al. |
| 5,115,459 A | 5/1992 | Bertozzi |
| 5,120,706 A | 6/1992 | Weeks, II |
| 5,121,105 A | 6/1992 | Aittoniemi |
| 5,127,030 A | 6/1992 | Annis et al. |
| 5,132,995 A | 7/1992 | Stein |
| 5,156,270 A | 10/1992 | Kachel et al. |
| 5,179,581 A | 1/1993 | Annis |
| 5,181,234 A | 1/1993 | Smith |
| 5,182,764 A | 1/1993 | Peschmann et al. |
| 5,212,720 A | 5/1993 | Landi et al. |
| 5,224,144 A | 6/1993 | Annis |
| 5,243,693 A | 9/1993 | Maron |
| 5,247,561 A | 9/1993 | Kotowski |
| 5,253,283 A | 10/1993 | Annis et al. |
| 5,260,982 A | 11/1993 | Fujii et al. |
| 5,313,511 A | 5/1994 | Annis et al. |
| 5,367,552 A | 11/1994 | Peschmann |
| 5,394,454 A | 2/1995 | Harding |
| 5,397,986 A | 3/1995 | Conway et al. |
| 5,420,905 A | 5/1995 | Bertozzi |
| 5,430,787 A | 7/1995 | Norton |
| 5,463,224 A | 10/1995 | Burstein et al. |
| 5,483,569 A | 1/1996 | Annis |
| 5,490,218 A | 2/1996 | Krug et al. |
| 5,493,596 A | 2/1996 | Annis |
| 5,503,424 A | 4/1996 | Agopian |
| 5,524,133 A | 6/1996 | Neale et al. |
| 5,528,656 A | 6/1996 | Annis |
| 5,572,121 A | 11/1996 | Beswick |
| 5,579,360 A | 11/1996 | Abdel-Mottaleb |
| 5,590,057 A | 12/1996 | Fletcher et al. |
| 5,600,303 A | 2/1997 | Husseiny et al. |
| 5,600,700 A | 2/1997 | Krug et al. |
| 5,602,893 A | 2/1997 | Harding |
| 5,638,420 A | 6/1997 | Armistead |
| 5,642,393 A | 6/1997 | Krug et al. |
| 5,642,394 A | 6/1997 | Rothschild |
| 5,660,549 A | 8/1997 | Witt, III |
| 5,666,393 A | 9/1997 | Annis |
| 5,692,028 A | 11/1997 | Geus et al. |
| 5,692,029 A | 11/1997 | Husseiny et al. |
| 5,696,806 A | 12/1997 | Grodzins et al. |
| 5,699,400 A | 12/1997 | Lee et al. |
| 5,763,886 A | 6/1998 | Schulte |
| 5,764,683 A | 6/1998 | Swift et al. |
| 5,796,110 A | 8/1998 | An et al. |
| 5,838,758 A | 11/1998 | Krug et al. |
| 5,882,206 A | 3/1999 | Gillio |
| 5,892,840 A | 4/1999 | Jang et al. |
| 5,910,973 A | 6/1999 | Grodzins |
| 5,930,326 A | 7/1999 | Rothschild et al. |
| 5,940,468 A | 8/1999 | Huang et al. |
| 5,966,422 A | 10/1999 | Dafni et al. |
| 5,974,111 A | 10/1999 | Krug et al. |
| 6,018,562 A | 1/2000 | Willson |
| 6,044,353 A | 3/2000 | Pugliese, III |
| 6,057,761 A | 5/2000 | Yukl |
| 6,081,580 A | 6/2000 | Grodzins et al. |
| 6,094,472 A | 7/2000 | Smith |
| 6,137,895 A | 10/2000 | Al-Sheikh |
| 6,151,381 A | 11/2000 | Grodzins et al. |
| 6,192,104 B1 | 2/2001 | Adams et al. |
| 6,212,251 B1 | 4/2001 | Tomura et al. |
| 6,236,709 B1 | 5/2001 | Perry et al. |
| 6,249,567 B1 | 6/2001 | Rothschild et al. |
| 6,269,142 B1 | 7/2001 | Smith |
| 6,272,206 B1 * | 8/2001 | Bjorkholm ............... 378/146 |
| 6,278,115 B1 | 8/2001 | Annis et al. |
| 6,282,264 B1 | 8/2001 | Smith et al. |
| 6,298,603 B1 | 10/2001 | Diaz |
| 6,301,326 B2 | 10/2001 | Bjorkholm |
| 6,301,327 B1 | 10/2001 | Martens et al. |
| 6,308,644 B1 | 10/2001 | Diaz |
| 6,315,308 B1 | 11/2001 | Konopka |
| RE37,467 E | 12/2001 | Brasch et al. |
| 6,366,203 B1 | 4/2002 | Burns |
| 6,370,222 B1 | 4/2002 | Cornick, Jr. |
| 6,375,697 B2 | 4/2002 | Davies |
| 6,393,095 B1 | 5/2002 | Robinson |
| 6,418,194 B1 | 7/2002 | McPherson et al. |
| 6,421,420 B1 | 7/2002 | Grodzins |
| 6,442,233 B1 | 8/2002 | Grodzins et al. |
| 6,459,761 B1 | 10/2002 | Grodzins et al. |

(56) References Cited

U.S. PATENT DOCUMENTS

| | | |
|---|---|---|
| 6,459,764 B1 | 10/2002 | Chalmers et al. |
| 6,473,487 B1 | 10/2002 | Le |
| 6,484,650 B1 | 11/2002 | Stomski |
| 6,507,278 B1 | 1/2003 | Brunetti et al. |
| 6,546,072 B1 | 4/2003 | Chalmers |
| 6,552,346 B2 | 4/2003 | Verbinski et al. |
| 6,553,096 B1 | 4/2003 | Zhou et al. |
| 6,556,653 B2 | 4/2003 | Hussein |
| 6,567,496 B1 | 5/2003 | Sychev |
| 6,597,760 B2 | 7/2003 | Beneke et al. |
| 6,610,977 B2 | 8/2003 | Megerle |
| 6,621,888 B2 | 9/2003 | Grodzins et al. |
| 6,628,745 B1 | 9/2003 | Annis et al. |
| 6,634,668 B2 | 10/2003 | Urffer, III et al. |
| 6,653,588 B1 | 11/2003 | Gillard-Hickman |
| 6,665,373 B1 | 12/2003 | Kotowski et al. |
| 6,674,367 B2 | 1/2004 | Sweatte |
| 6,707,879 B2 | 3/2004 | McClelland et al. |
| 6,721,391 B2 | 4/2004 | McClelland et al. |
| 6,742,301 B1 | 6/2004 | Schwarz |
| 6,745,520 B2 | 6/2004 | Puskaric et al. |
| 6,749,207 B2 | 6/2004 | Nadeau |
| 6,754,304 B1 | 6/2004 | Kumakhov |
| 6,785,360 B1 | 8/2004 | Annis |
| 6,819,109 B2 | 11/2004 | Sowers et al. |
| 6,819,241 B2 | 11/2004 | Turner et al. |
| 6,839,403 B1 | 1/2005 | Kotowski et al. |
| 6,848,826 B2 | 2/2005 | Marie et al. |
| 6,870,791 B1 | 3/2005 | Caulfield et al. |
| 6,876,719 B2 | 4/2005 | Ozaki |
| 6,879,657 B2 | 4/2005 | Hoffman |
| 6,891,381 B2 | 5/2005 | Bailey et al. |
| 6,899,540 B1 | 5/2005 | Neiderman et al. |
| 6,901,346 B2 | 5/2005 | Tracy et al. |
| 6,911,907 B2 | 6/2005 | Kelliher et al. |
| 6,952,163 B2 | 10/2005 | Huey et al. |
| 6,965,340 B1 | 11/2005 | Baharav et al. |
| 6,967,612 B1 | 11/2005 | Gorman et al. |
| 6,970,086 B2 | 11/2005 | Nelson |
| 6,970,087 B2 | 11/2005 | Stis |
| 6,990,175 B2 | 1/2006 | Nakashima et al. |
| 7,053,785 B2 | 5/2006 | Akins |
| 7,092,485 B2 | 8/2006 | Kravis |
| 7,103,137 B2 | 9/2006 | Seppi et al. |
| 7,110,493 B1 | 9/2006 | Kotowski et al. |
| 7,110,925 B2 | 9/2006 | Pendergraft et al. |
| 7,114,849 B2 | 10/2006 | Atzinger et al. |
| 7,142,638 B2 | 11/2006 | Polichar et al. |
| 7,162,005 B2 | 1/2007 | Bjorkholm |
| 7,164,747 B2 | 1/2007 | Ellenbogen et al. |
| 7,185,206 B2 | 2/2007 | Goldstein |
| 7,203,276 B2 | 4/2007 | Arsenault et al. |
| 7,257,189 B2 | 8/2007 | Modica et al. |
| 7,265,709 B2 | 9/2007 | Fleisher et al. |
| 7,286,634 B2 | 10/2007 | Sommer, Jr. et al. |
| 7,305,062 B2 | 12/2007 | Hambüchen et al. |
| 7,305,063 B2 | 12/2007 | Heuscher |
| 7,330,529 B2 | 2/2008 | Kautzer et al. |
| 7,333,587 B2 | 2/2008 | De Man et al. |
| 7,356,115 B2 | 4/2008 | Ford et al. |
| 7,365,672 B2 | 4/2008 | Keller et al. |
| 7,400,701 B1 | 7/2008 | Cason |
| 7,418,077 B2 | 8/2008 | Gray |
| 7,460,636 B2 | 12/2008 | Ein-Gal |
| 7,476,023 B1 | 1/2009 | Canfield et al. |
| 7,505,557 B2 | 3/2009 | Modica et al. |
| 7,505,562 B2 | 3/2009 | Dinca et al. |
| 7,551,709 B2 | 6/2009 | Schlomka et al. |
| 7,551,715 B2 | 6/2009 | Rothschild et al. |
| 7,561,666 B2 | 7/2009 | Annis |
| 7,593,506 B2 | 9/2009 | Cason |
| 7,593,510 B2 | 9/2009 | Rothschild |
| 7,639,866 B2 | 12/2009 | Pomero et al. |
| 7,660,388 B2 | 2/2010 | Gray |
| 7,684,544 B2 | 3/2010 | Wilson |
| 7,783,004 B2 | 8/2010 | Kotowski et al. |
| 7,796,394 B2 | 9/2010 | Wang et al. |
| 7,796,733 B2 | 9/2010 | Hughes |
| 7,796,734 B2 | 9/2010 | Mastronardi et al. |
| 7,806,589 B2 | 10/2010 | Tashman et al. |
| 7,809,109 B2 | 10/2010 | Mastronardi et al. |
| 7,817,776 B2 | 10/2010 | Agrawal et al. |
| 7,826,589 B2 | 11/2010 | Kotowski et al. |
| 8,135,112 B2 | 3/2012 | Hughes |
| 2002/0045152 A1 | 4/2002 | Viscardi et al. |
| 2003/0012338 A1 | 1/2003 | Lienard et al. |
| 2003/0171939 A1 | 9/2003 | Yagesh et al. |
| 2003/0225612 A1 | 12/2003 | DeSimone et al. |
| 2003/0229506 A1 | 12/2003 | Scott et al. |
| 2004/0088584 A1 | 5/2004 | Shachar et al. |
| 2004/0175018 A1 | 9/2004 | MacArthur et al. |
| 2006/0262902 A1 | 11/2006 | Wattenburg |
| 2007/0009088 A1 | 1/2007 | Edic et al. |
| 2007/0086564 A1 | 4/2007 | Bruder et al. |
| 2007/0235652 A1 | 10/2007 | Smith |
| 2011/0017917 A1 | 1/2011 | Mastronardi et al. |
| 2011/0096901 A1 | 4/2011 | Kotowski et al. |
| 2011/0164726 A1 | 7/2011 | Mastronardi et al. |
| 2011/0274249 A1 | 11/2011 | Gray et al. |
| 2011/0274250 A1 | 11/2011 | Gray et al. |
| 2011/0293072 A1 | 12/2011 | Kaminski |
| 2011/0299659 A1 | 12/2011 | Gray et al. |

FOREIGN PATENT DOCUMENTS

| | | |
|---|---|---|
| WO | WO 2009/082762 | 7/2009 |
| WO | WO 2009082762 | 7/2009 |
| WO | WO/2011/115923 A1 | 9/2011 |
| WO | WO/2011/115930 A2 | 9/2011 |
| WO | WO/2011/115934 A2 | 9/2011 |
| WO | WO/2011/115935 A1 | 9/2011 |

OTHER PUBLICATIONS

Daniel Strom, "Screening Individuals with Backscatter X-Ray Systems", Health Physics Society, Feb. 3, 2005.

Gerald J. Smith, "Bodysearch Technology es X-ray Imaging to Remove Hazards and Humiliation from Personnel Searches", IEEE, 1995.

International Search Report for PCT/US2008/067619, Aug. 20, 2008, Rapiscan Security Products.

International Search Report for PCT/US2008/088345, Apr. 3, 2009, Rapiscan Security Products.

MSNBC, "Airports Seek Hi-Tech Security", Apr. 3, 2002.

Murray et al., "Exploitation of X-Ray Technology for the Detection of Contraband-Aviation Security Applications", European Conference on Security and Detection, Apr. 28-30, 1997.

Rapiscan Security Products, Secure 1000 Brochure, 2002.

Rapiscan Security Products, Secure 1000 Concealed Object Detection System, Nov. 1998.

Rapiscan Systems Secure 1000 Case Study, London Heathrow Terminal 4, Fall 2004.

St. Bartholomew's Hospital, Radiation Safety Report on the Rapiscan Secure 1000 X-Ray System, Nov. 4, 2004.

International Search Report for PCT/US11/28411, completed on Sep 16, 2011; Rapiscan Systems Inc.

International Search Report for PCT/US11/28393, completed on Jun 29, 2011; Rapiscan Systems Inc.

International Search Report for PCT/US11/28403, completed on Sep 28, 2011; Rapiscan Systems Inc.

International Search Report for PCT/US11/28413, completed on Jun 30, 2011; Rapiscan Systems Inc.

* cited by examiner

| ANALYSIS OF CHOPPER WHEEL REV 2.0, 01-13-2009 | | | | | | | | | | |
|---|---|---|---|---|---|---|---|---|---|---|
| Angular Displacement | -45 | -40 | -35 | -30 | -25 | -20 | -15 | -10 | -5 | |
| Linear Displacement in Scan Plane | 31.19421 | 26.17030 | 21.83506 | 18.00146 | 14.53742 | 11.34572 | 8.35166 | 5.49536 | 2.72638 | |
| Scan Displacement Between the Points | 5.02391 | 4.33524 | 3.83360 | 3.46404 | 3.19170 | 2.99406 | 2.85630 | 2.76898 | 2.72638 | |
| Projected Target Width | 0.45321 | 0.41861 | 0.39170 | 0.37068 | 0.35437 | 0.34192 | 0.33276 | 0.32651 | 0.32289 | |
| Projected Target Height | 0.64496 | 0.54935 | 0.48028 | 0.42958 | 0.39214 | 0.36469 | 0.34508 | 0.33191 | 0.32430 | |
| Projected Target Size | 0.29230 | 0.22996 | 0.18813 | 0.15924 | 0.13896 | 0.12469 | 0.11483 | 0.10837 | 0.10471 | |

... To Fig.4C

| | 0 | 5 | 10 | 15 | 20 | 25 | 30 | 35 | 40 | 45 |
|---|---|---|---|---|---|---|---|---|---|---|
| | 0.00000 | 2.72638 | 5.49536 | 8.35166 | 11.34572 | 14.53742 | 18.00146 | 21.83506 | 26.17030 | 31.19421 |
| | 2.72638 | 2.72638 | 2.76898 | 2.85630 | 2.99406 | 3.19170 | 3.46404 | 3.83360 | 4.33524 | 5.02391 |
| | 0.32108 | 0.32289 | 0.32651 | 0.33276 | 0.34192 | 0.35437 | 0.37068 | 0.39170 | 0.41861 | 0.45321 |
| | 0.32178 | 0.32430 | 0.33191 | 0.34508 | 0.36469 | 0.39214 | 0.42958 | 0.48028 | 0.54935 | 0.64496 |
| | 0.10332 | 0.10471 | 0.10837 | 0.11483 | 0.12469 | 0.13896 | 0.15924 | 0.18813 | 0.22996 | 0.29230 |

From Fig.4A

FIG. 4C
PRIOR ART

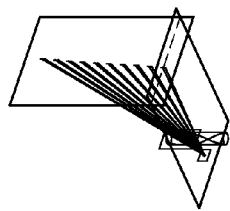

| ANALYSIS OF SPINROLL | | | | | | | | | | |
|---|---|---|---|---|---|---|---|---|---|---|
| SpinRoll Angular Rotation on Z Axis (Deg) | -90 | -80 | -70 | -60 | -50 | -40 | -30 | -20 | -10 | |
| Beam Angular Displacement at 18" Scan Plane (Deg) | -45 | -40 | -35 | -30 | -25 | -20 | -15 | -10 | -5 | |
| Linear Displacement at 18" Scan Plane (IN) | 31.2044 | 27.7710 | 24.3641 | 20.9194 | 17.4359 | 13.9331 | 10.4347 | 6.9475 | 3.4697 | |
| Scan Displacement Between the Points (IN) | 3.4334 | 3.4069 | 3.4447 | 3.4835 | 3.5028 | 3.4984 | 3.4872 | 3.4778 | 3.4697 | |
| Spot Size Width at the Spinroll CL (IN in X Axis) | 0.0486 | 0.0539 | 0.0517 | 0.0556 | 0.0571 | 0.0582 | 0.0591 | 0.0597 | 0.0600 | |
| Spot Size Height at the Spinroll CL (IN in Z Axis) | 0.1045 | 0.1241 | 0.1154 | 0.1295 | 0.1343 | 0.1390 | 0.1437 | 0.1460 | 0.1477 | |
| Spot Size at the Spinroll CL in IN*IN | 0.0051 | 0.0067 | 0.0060 | 0.0072 | 0.0077 | 0.0081 | 0.0085 | 0.0087 | 0.0089 | |
| Projected Target Width at SpinRoll L CL (IN in X Axis) | 0.2613 | 0.2844 | 0.3002 | 0.3108 | 0.3173 | 0.3209 | 0.3225 | 0.3228 | 0.3229 | |
| Projected Target Height at SpinRoll L CL (IN in Z Axis) | 0.7940 | 0.8500 | 0.8762 | 0.8693 | 0.8532 | 0.8368 | 0.8257 | 0.8086 | 0.7993 | |
| Projected Target Size in IN*IN at SpinRoll L CL | 0.1037 | 0.1209 | 0.1315 | 0.1351 | 0.1354 | 0.1343 | 0.1331 | 0.1305 | 0.1290 | |

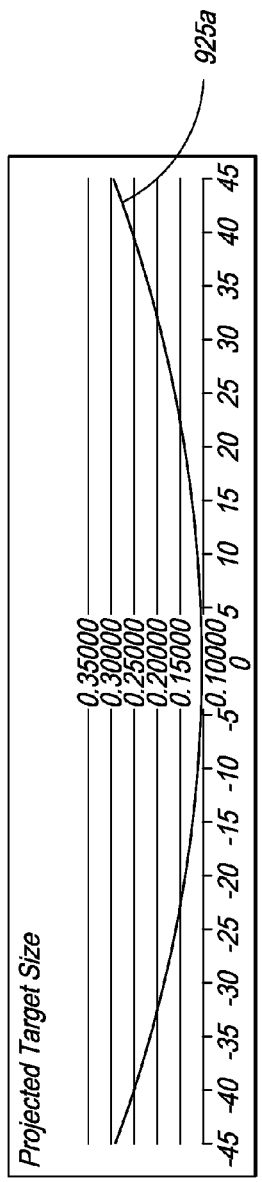
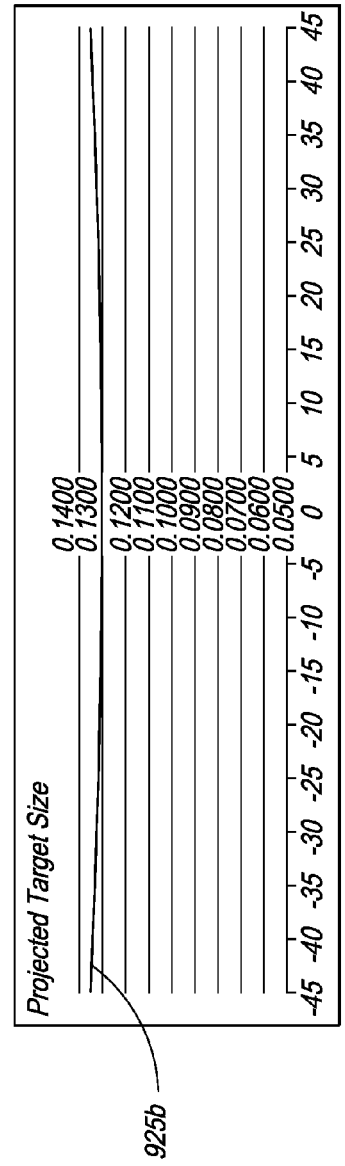
FIG. 9A PRIOR ART
FIG. 9B

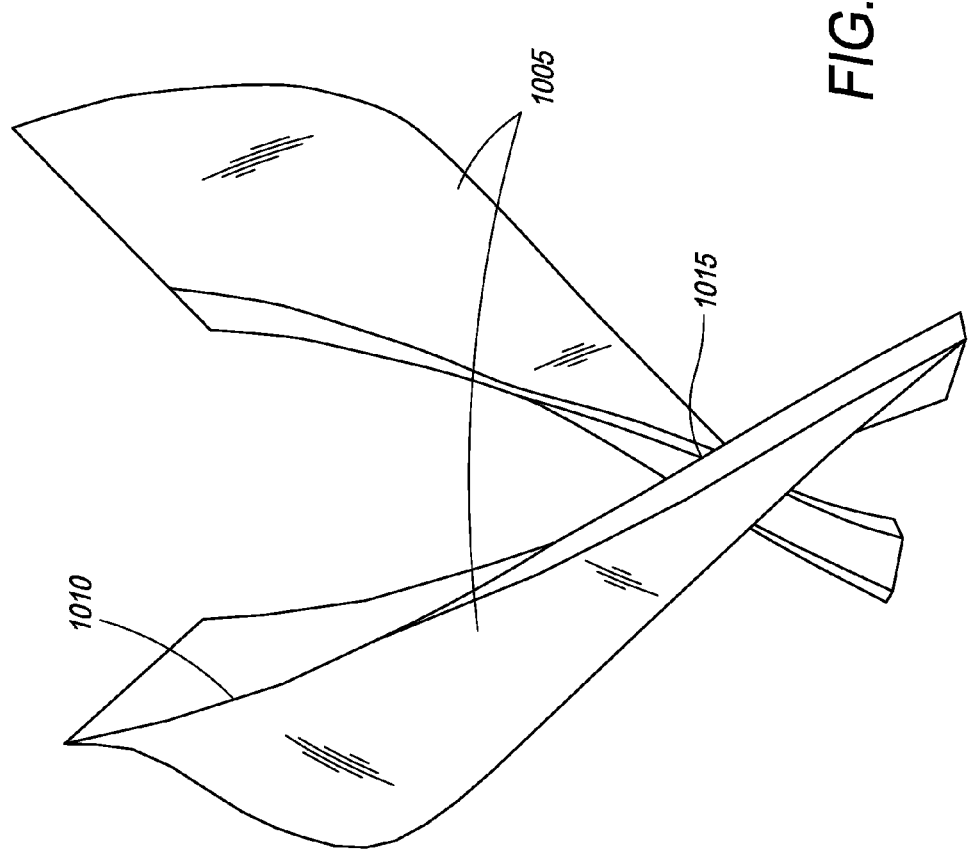

BEAM FORMING APPARATUS

CROSS-REFERENCE TO RELATED APPLICATIONS

The present specification relies on U.S. Provisional Patent Application No. 61/313,772, filed on Mar. 14, 2010, for priority, and is herein incorporated by reference in its entirety.

FIELD OF THE INVENTION

The specification relates generally to security systems for screening threats contained on persons, and specifically, to a helical shutter for an electron beam system, and more specifically, to a system and method for modifying the shape of a travelling radiation scan beam, using helical apertures on a cylindrical surface.

BACKGROUND OF THE INVENTION

Security systems are presently limited in their ability to detect contraband, weapons, explosives, and other dangerous objects concealed under clothing. Metal detectors and chemical sniffers are commonly used for the detection of large metal objects and certain types of explosives; however, a wide range of dangerous objects exist that cannot be detected using these devices. Plastic and ceramic weapons increase the types of non-metallic objects that security personnel are required to detect. Manual searching of subjects is slow, is inconvenient, and would not be well tolerated by the general public, especially as a standard procedure in high traffic centers, such as airports.

It is known in the art that images of various types of material can be generated using X-ray scattering. The intensity of scattered X-rays is related to the atomic number (Z) of the material scattering the X-rays. In general, for atomic numbers less than 25, the intensity of X-ray backscatter, or X-ray reflectance, decreases with increasing atomic number. Images are primarily modulated by variations in the atomic number of the subject's body. Low-Z materials present a special problem in personnel inspection because of the difficulty in distinguishing the low-Z object from the background of the subject's body which also has low-Z.

Known prior art X-ray systems for detecting objects concealed on persons have limitations in their design and method that prohibit them from achieving low radiation doses, which is a health requirement, or prevent the generation of high image quality, which are prerequisites for commercial acceptance. An inspection system that operates at a low level of radiation exposure is limited in its precision by the small amount of radiation that can be directed against a person being searched. X-ray absorption and scattering further reduces the amount of X-rays available to form an image of the person and any concealed objects. In prior art systems this low number of detected X-rays has resulted in unacceptably poor image quality.

This problem is even more significant if an X-ray inspection system is being used in open venues such as stadiums, shopping malls, open-air exhibitions and fairs, etc. This is because that in such venues, people can be located both proximate to and/or at a distance from the machine. If a person being scanned is not very close to the X-ray machine, the obtained image may not be clear enough since the amount of radiation reaching the person is very low. This limits the range of scanning of the system to a few feet from the front of the machine. If, however, a person being scanned is too close to the X-ray machine, the amount of radiation impinging on the person may not be safe.

The amount of radiation exposure caused by known X-ray screening systems is commonly limited by the beam chopping apparatus employed in the systems.

Conventional beam chopping mechanisms generally consist of a disc wheel with collimator slits embedded therein at fixed distances from one another. The disc wheel is spun at a particular velocity and an X-ray beam of a particular energy is directed into more focused beams when passing through slits of the chopper wheel. The conventional chopper wheel is described in greater detail below throughout the specification in reference to the present disclosure.

It should be understood by persons having ordinary skill in the art that radiation sources are typically very heavy. In order to accommodate for the weight of the X-ray source, a chopper wheel configuration, as employed in the prior art, would need to be rather large. This substantially increases the weight of the system and makes it less portable. In addition, the chopper wheel, as employed in the prior art, is fraught with balance and gyroscopic effects. For example, the gyroscopic effect can be likened to a gyroscope toy where a string is pulled (such as a spinning top). As the top is spun fast, fluctuations in motion are not discernable, but, once it slows down, the top will start to wobble and vibrate. Thus, there is a certain RPM that must be kept to maintain balance. In addition, with increasing weight there are issues of humming noises at higher RPMs. In order to overcome the challenges in using conventional chopper wheel configurations, mechanical manipulation of the speed and size of the chopper wheel is necessary.

Therefore, what is needed is a beam chopping apparatus, and more specifically, a helical shutter for an electron beam system, that allows for variability in both velocity and beam spot size by modifying the physical characteristics or geometry of the beam chopper apparatus.

There is also need for a beam chopping apparatus, and more specifically, a helical shutter for an electron beam system, which provides a vertically moving beam spot with constant size and velocity to allow for equal illumination of the target.

Further, there is need for a beam chopping apparatus, and more specifically, a helical shutter for an electron beam system, which creates a wider field of view during operation.

Also, there is need for a beam chopping apparatus, and more specifically, a helical shutter for an electron beam system, that is lightweight and does not cause an X-ray source assembly employing the beam chopper to become heavy and difficult to deploy.

SUMMARY OF THE INVENTION

The present specification discloses an X-ray apparatus comprising: a) an X-ray source for emitting X-ray radiation; and b) a beam chopping (or beam forming) apparatus coupled to said X-ray source, wherein said beam chopping apparatus is adapted to receive said X-ray radiation and form a moving beam spot having a frequency, wherein said beam frequency is substantially constant.

Optionally, the beam chopping apparatus comprises a hollow cylinder having at least one helical aperture. The beam chopping apparatus comprises a hollow cylinder having at least two helical apertures. The beam has a linear scan velocity and wherein said linear scan velocity is varied by modifying a pitch and roll of at least one of said helical apertures. The beam has a linear scan velocity and wherein said linear scan velocity is kept constant by modifying a pitch and roll of at least one of said helical apertures. The beam has a spot size and wherein said spot size is varied by modifying an aperture width of at least one of said helical apertures. The beam has a spot size and wherein said spot size is kept constant by modifying an aperture width of at least one of said helical apertures. The X-ray apparatus further comprises a motor for rotating said cylinder. The X-ray apparatus further comprises a controller for dynamically modifying a rotation speed of said cylinder to achieve a predetermined scan velocity. The rotation speed is equal to or less than 80,000 rpm. The beam has a scan velocity and a spot size and wherein scan velocity and spot size can be modified without varying a speed of said motor. The beam chopping apparatus comprises a hollow cylinder having at least two helical apertures, each having a length and an aperture width along said length and wherein said aperture width narrows along length. The beam chopping apparatus comprises a hollow cylinder having at least two helical apertures, each having a length and an aperture width along said length and wherein said aperture width increases along length.

In another embodiment, the X-ray apparatus comprises: a) an X-ray source for emitting X-ray radiation; and b) a beam chopping (or beam forming) apparatus coupled to said X-ray source, wherein said beam chopping apparatus is adapted to receive said X-ray radiation and form a moving beam spot having a velocity, wherein said beam velocity is substantially constant.

In another embodiment, the X-ray apparatus comprises: a) an X-ray source for emitting X-ray radiation; and b) a beam chopping (or beam forming) apparatus coupled to said X-ray source, wherein said beam chopping apparatus comprises a hollow cylinder with a first end and a second end defining a length of said cylinder and at least one helical aperture extending substantially along said length, wherein said cylinder is adapted to receive said X-ray radiation and emit said X-ray radiation through said helical aperture.

Optionally, the X-ray radiation passes through the helical aperture to produce a beam spot projection pattern, wherein said beam spot projection pattern comprises a beam spot moving vertically with a substantially constant velocity in a plane perpendicular to a plane of the X-ray source. The beam spot projection pattern comprises a beam spot moving vertically with a substantially constant velocity in a plane parallel to a plane of the beam chopping apparatus. The beam spot provides substantially equal illumination of a target object. The beam spot is trapezoidal. The helical aperture has a width that is more narrow at the second end relative to said first end.

BRIEF DESCRIPTION OF THE DRAWINGS

These and other features and advantages of the present invention will be appreciated, as they become better understood by reference to the following detailed description when considered in connection with the accompanying drawings, wherein:

FIG. 9A is a graphical illustration of the variation of projected target/beam spot size using the prior art disc wheel chopper, where data is provided for a total scanning beam traversal of −45 to +45 degrees;

FIG. 9B is a graphical illustration of the variation of projected target/beam spot size using the spin-roll chopper of the present invention, where data is provided for a total scanning beam traversal of −45 to +45 degrees and a spin-roll chopper rotation of −90 to +90 degrees;

FIG. 10 is a mathematical expression of the trajectory of the beam using the spin-roll chopper of the present invention with a single source, in accordance with one embodiment;

DETAILED DESCRIPTION OF THE INVENTION

The present invention provides a spin-roll beam chopper apparatus, or a helical shutter for an electron beam system, which when implemented in a system for threat detection provides an improved method of screening individuals at security locations without exposing the individuals to high radiation while retaining the efficiency of the screening process. The beam chopper of the present invention allows for maximum threat detection performance and image clarity irrespective of the individual's distance from the screening system. In addition, the spin-roll chopper of the present invention is advantageous in that it can be spun at relatively high speeds, and therefore will effectively reduce the scan time required per person. Further, the spin-roll chopper of the present invention allows for variable velocity and beam spot size with modification of the physical characteristics or geometry of the spin-roll chopper.

In one embodiment of the present invention, the spin-roll chopper is used in conjunction with a threat detection system in which a radiographic image is formed using any available radiation imaging technique for "body imaging" such as, but not limited to X-ray scattering, infrared imaging, millimeter wave imaging, RF imaging, radar imaging, holographic imaging, CT imaging, and MRI. Any "body imaging" system that has the potential for displaying body detail may be employed. In one embodiment, any photodetectable radiation or any radiation source with a light beam may be employed with the spin-roll chopper of the present invention.

The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Figure 1:
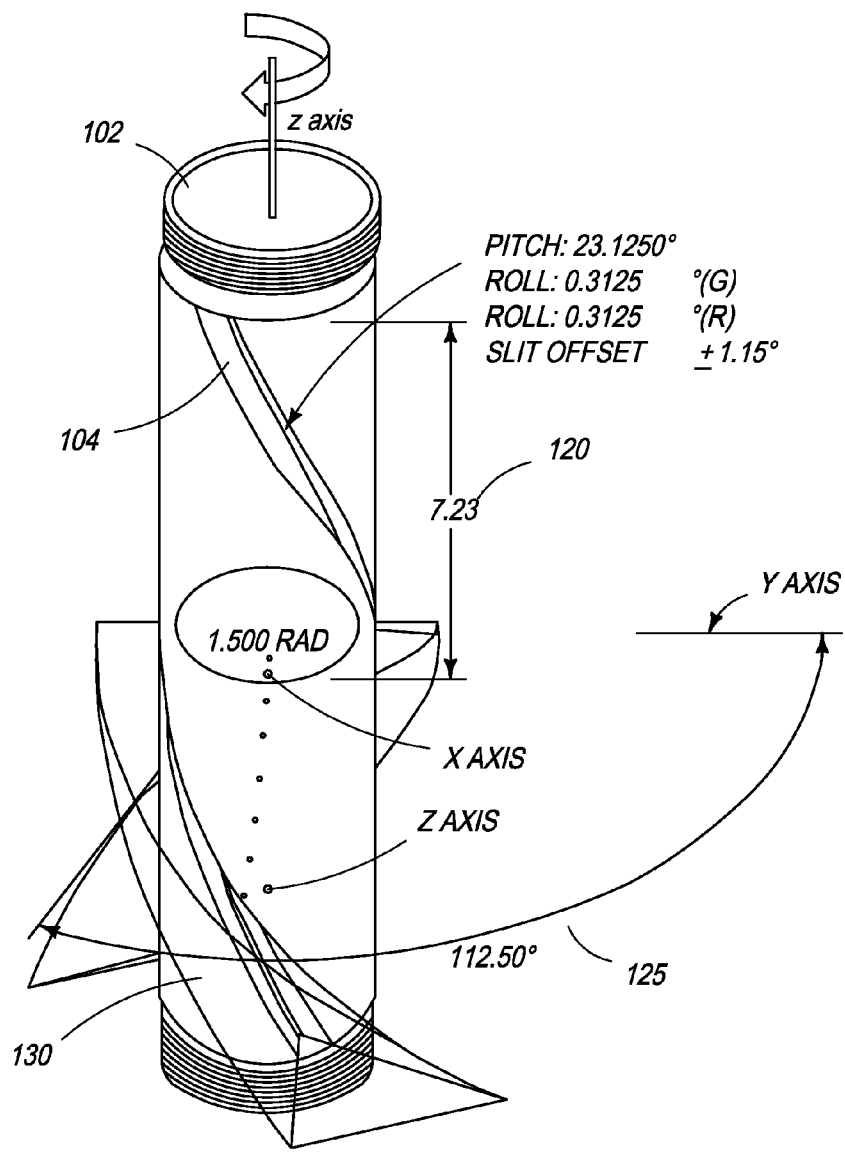
FIG. 1 is a mechanical illustration of an exemplary design of one embodiment of the spin-roll chopper of the present invention.

In various embodiments, the present invention provides a unique beam chopping mechanism that is designed to present a helical profile shutter (aperture), formed on a cylinder, for X-ray beam scanners. FIG. 1 illustrates an exemplary design for one embodiment of the spin-roll chopper, as used in various embodiments of the present invention. Beam chopper 102 is, in one embodiment, fabricated in the form of a hollow cylinder having helical chopper slits 104. The cylindrical shape enables the beam chopper 102 to rotate about the Z-axis and along with the helical apertures 104, create a spin-roll motion, which provides effective scanning and therefore good image resolution, as described below, while at the same time keeping the chopper lightweight and having less moment of inertia as the spin-roll mass is proximate to the axis of rotation. Stated differently, the radius of the spin-roll chopper is small compared to prior art beam chopping mechanisms, and in particular, the disc chopper.

In one embodiment, the hollow cylinder has a height 120 of 7.23 inches at the half-way point along its vertical axis. Therefore, in one embodiment, the full height of the cylinder is 14.46 inches. The helical slits 104, in one embodiment, have a helical twist angle 125 of 112.5 degrees, a pitch of 23.1250 degrees and a roll of 0.3125 degrees. It should be noted that the helical twist angle 125 represents the angle of motion of the helical aperture from the y-axis (center line) when the cylinder is spun about the z-axis a total of 90 degrees.

Thus, an X-ray beam scanner employing the spin-roll chopper of the present invention effectuates beam chopping by rotating the hollow cylinder 102 machined with at least two helical slits 104, which enables X-ray beam scanning with both constant and variable linear scan beam velocity and scan beam spot size. The spin-roll chopper of the present invention enables both constant and variable linear scan beam velocity by manipulating the geometry of the helical apertures. In one embodiment, the velocity is varied or kept constant by manipulating the pitch and roll of the helical apertures along the length of the spin-roll chopper. Thus, it is possible to have a constant speed or to slow the scan down towards areas where more resolution is desired.

The spin-roll chopper of the present invention also enables variable and constant beam spot size by manipulating the geometry of the helical apertures, thus varying the resultant beam power. In one embodiment, it is possible to manipulate the actual width of the aperture to alter the beam spot size. In one embodiment, the width of the helical aperture varies along the length of the spin-roll chopper cylinder to compensate for the varying distance of the aperture from the center of the source and allow for uniform beam spot projection along the scan line. Thus, in one embodiment, the farther the aperture is away from the source, the narrower the width of the helical aperture to create a smaller beam spot size. In one embodiment, the closer the aperture is to the source, the wider the helical aperture to create a larger beam spot size. This structure is described in greater detail below.

When employed in a body scanning system, it is possible to vary the pitch and roll and width of the helical apertures such that more beam scanning power is directed towards areas of the body (hair, feet, etc) that require more detail and resolution and less power is directed towards areas of the body (midsection, etc.) that are more sensitive to radiation.

Helical slits 104 also ensure that the projection of the X-ray beam is not limited by the dual collimation of the two slits. As described in greater detail below, dual collimation refers to the concept whereby the X-ray beam will pass through two helical slits at any given point in time. The resultant X-ray beam trajectory 130 is also shown in FIG. 1 and described in greater detail with respect to FIG. 10 below. In one embodiment, a pair of helices will produce one travelling beam. In another embodiment, additional pairs of helices may optionally be added to produce additional travelling beams depending upon scanning requirements. It should be noted that the chopper wheel of the prior art is only capable of producing one scanning beam.

In an embodiment of the present invention a plurality of viewing angles ranging from sixty degrees to ninety degrees can be obtained through the helical slits in the spin-roll chopper. In one embodiment, the scan angle is a function of the distance between the spin-roll chopper and both the source and the target. In addition, the overall height and diameter of the spin-roll chopper affects the viewing angle. The closer the spin-roll is placed to the source, the smaller the spin-roll chopper will need to be and similarly, the farther the spin-roll chopper is placed from the source, the larger the spin-roll chopper would need to be.

Figure 2:
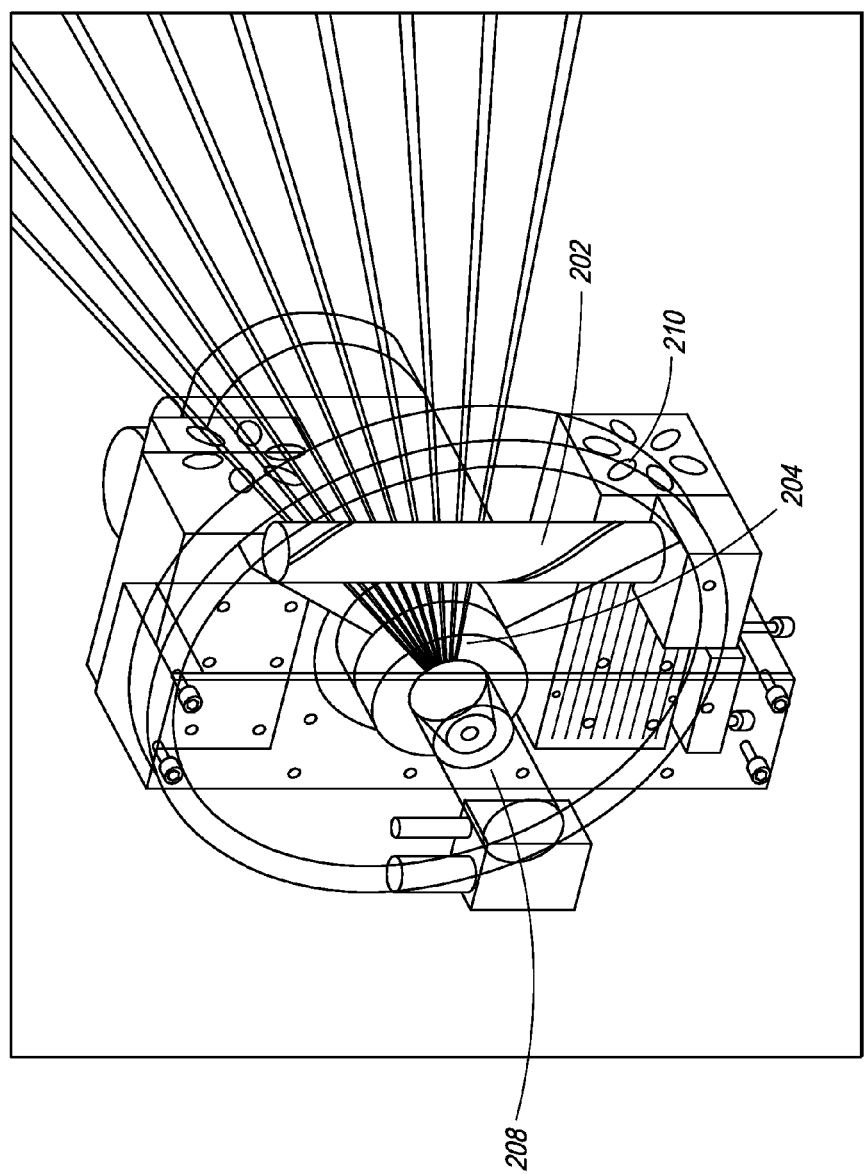
FIG. 2 illustrates the spin-roll chopper mechanism of the present invention with an X-ray source and overlaid onto a conventional chopper wheel, showing the size difference between the two.

FIG. 2 illustrates a beam chopping mechanism using the spin-roll chopper described with respect to FIG. 1. Referring to FIG. 2, the cylindrical spin-roll chopper 202 is placed in front of a radiation source 204, which, in one embodiment, comprises an X-ray tube. In one embodiment, rotation of the chopper 202 is facilitated by including a suitable motor 208, such as an electromagnetic motor. In another embodiment, as described in greater detail below, magnetic bearings are employed to facilitate rotational movement of the spin-roll chopper of the present invention. The speed or RPM of rotation of the spin-roll chopper system is dynamically controlled to optimize the scan velocity. In one embodiment, the spin-roll chopper system is capable of achieving speeds up to 80K RPM.

In one embodiment, a radiation shield (not shown) is provided on radiation source 204 such that only a fan beam of radiation is produced from the source. The fan beam of radiation emits X-rays and then passes through the spin-roll chopper, which acts as an active shutter.

Thus, there is only a small opening when the spin-roll chopper, and therefore helical apertures are rotating, which provides the moving flying spot beam.

FIG. 2 also shows a conventional, prior art disc chopper wheel 210 superimposed upon the source along with the spin-roll chopper. It can be seen from FIG. 2 that chopper wheel 210 is substantially larger than spin-roll chopper 202.

For prior art chopper wheels, because of the round nature of the chopper wheel itself, the resultant flying spot beam has different acceleration and deceleration coming in right on the axis. Also, the chopper wheel itself has only one opening at each point that the ray passes through. Since the geometrical characteristics of the singular aperture cannot be changed, the farther the slit is from the center, the bigger the beam, and the closer the slit is from the center, the smaller the beam. Further, the velocity and spot size can only be mechanically manipulated using the prior art chopper wheel, by varying the speed of the motor attached to the chopper wheel. It should be noted, however, that since there are multiple apertures in the disc chopper wheel, there will always be a variance in the frequency and the scanning line because it is difficult to create each aperture such that they behaves in the exact same manner, as is known to those of skill in the art. The spin-roll chopper of the present invention overcomes these disadvantages because it is designed such that the frequency is continuous throughout.

FIGS. 3A to 3D illustrate a geometrical rendering of a flying X-ray spot beam projection obtained by using the spin-roll chopper of the present invention, described in FIG. 1, showing empirical data captured at five degree increments of a total scanning beam traversal of +45 degrees and spin-roll chopper rotation of −90 to +90 degrees. Thus, to generate empirical data, the scan is frozen in time at 5 degree increments of a total scanning beam traversal of 45 degrees. It should be understood, however, that the movement of the spin-roll and traversal of the scanning beam are continuous in application.

Referring to FIGS. 3A through 3D simultaneously, radiation emitted by a radiation source 302, such as an X-ray source, is modulated by the spin-roll chopper 304. The radiation beam, at each rotation, passes through two helical slits 315 of the chopper 304 to produce the resultant beam spot projection pattern (target) 306, in the "target" plane 308 which, in one embodiment, is perpendicular to the plane 310 of the X-ray source and parallel to the plane 312 of the chopper 304. In one embodiment, "target" plane 308 is located 18 inches from the source 302. It should be noted herein that these scan points, while empirical data points, are representative of real motion of the beam and chopping mechanisms, and are presented to show the advantages of the present invention. Thus, it should be understood that the true movement so the traversing radiation beam and rotation of the spin-roll chopper are continuous.

Figure 3A:
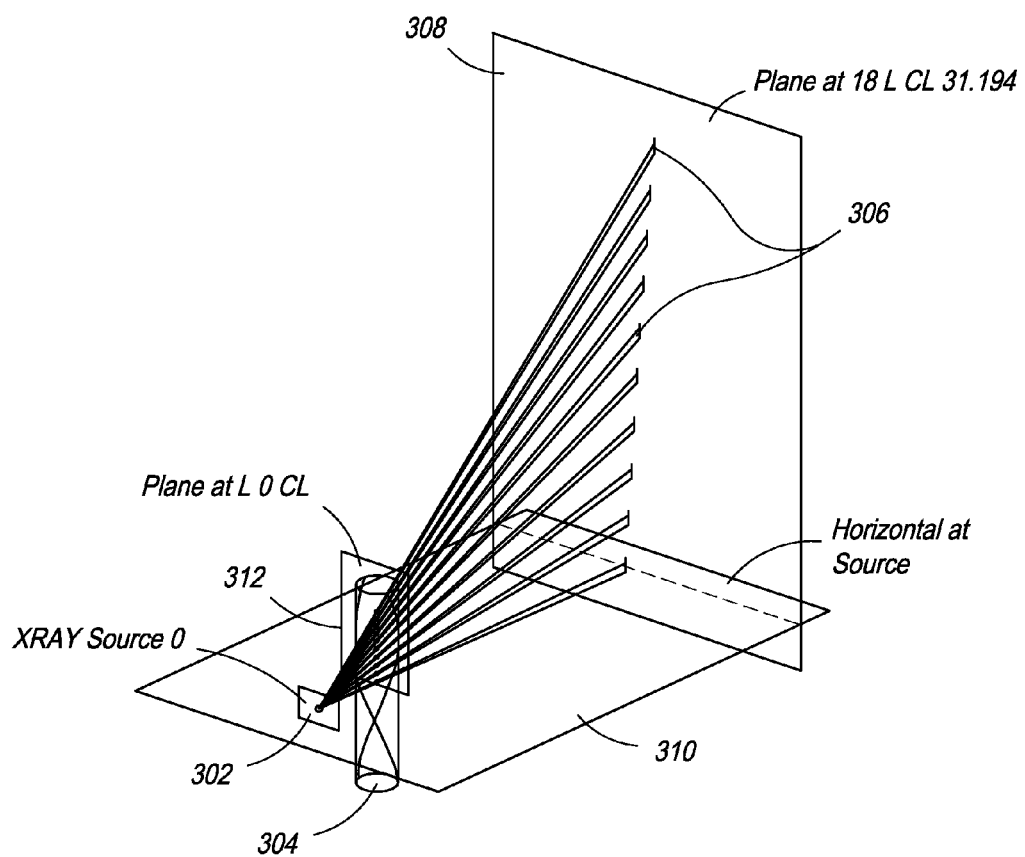
FIG. 3A illustrates a first view of the X-ray spot projection obtained by using an exemplary spin-roll chopper, in accordance with an embodiment of the present invention, illustrating empirical data at five degree increments of a total scanning beam traversal of +45 degrees and spin-roll chopper rotation of −90 to +90 degrees.
Figure 3B:
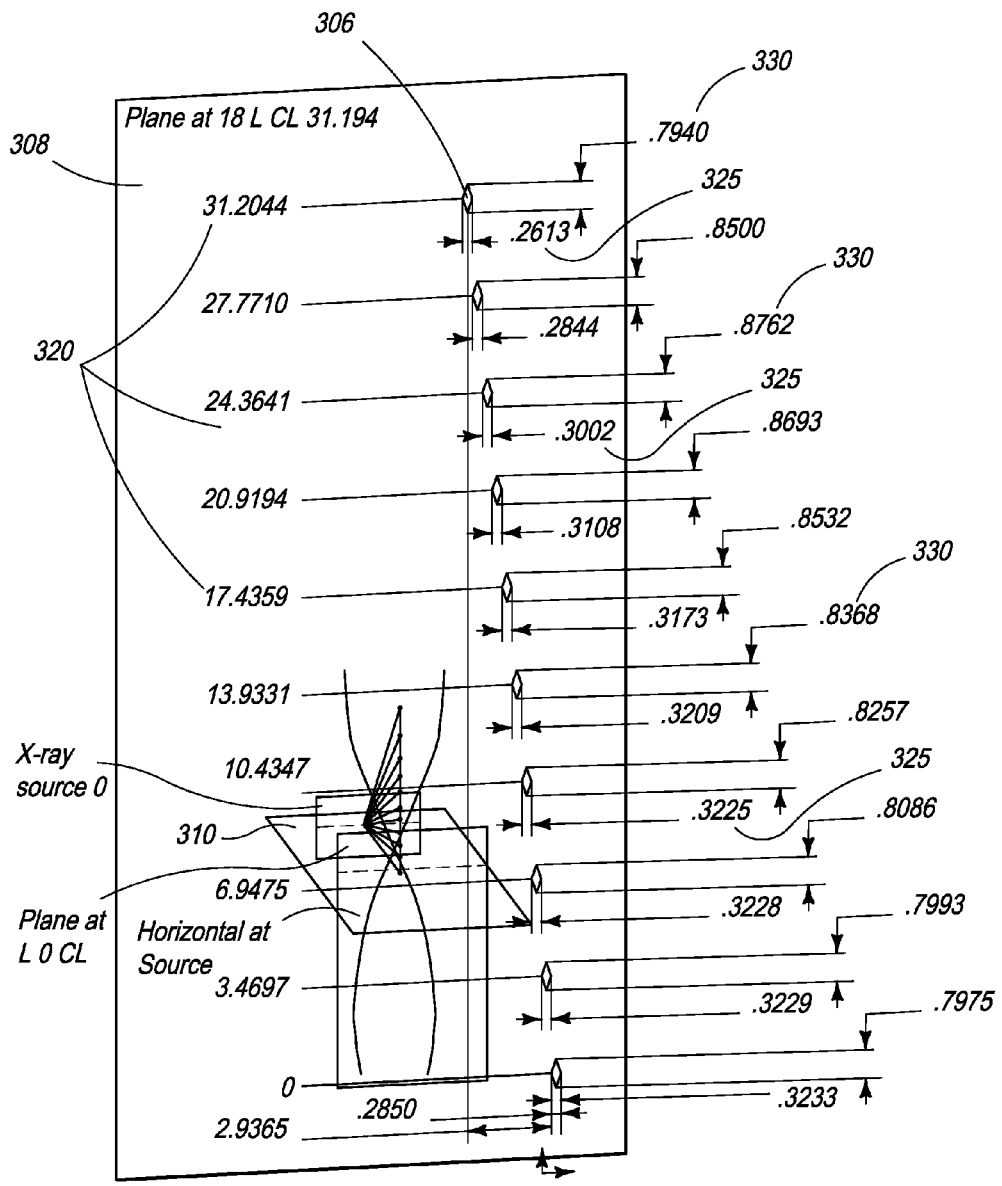
FIG. 3B is a diagram showing the linear displacement values between flying spots and the relative shape and size of the flying spots that result from using the spin-roll chopper of the present invention, where the empirical data represents five degree increments of a total scanning beam traversal of 45 degrees and spin-roll chopper rotation of −90 to +90 degrees.

FIG. 3B is a diagram showing the linear displacement values between flying spots and the relative shape and size of the flying spots that result from using the spin-roll chopper of the present invention, where the empirical data represents five degree increments of a total scanning beam traversal of 45 degrees and spin-roll chopper rotation of −90 to +90 degrees. As shown more clearly in FIG. 3B, in one embodiment, the beam spot pattern 306 produced exhibits characteristics consistent or superior to that of detection systems using prior art wheel chopping mechanisms. As mentioned above, the spin-roll chopper 304 allows for customization of the size and position of the beam spot 306 by modifying the helical aperture width and helical pitch and roll along the cylinder. FIG. 3B illustrates exemplary values of the linear displacements 320, at scan plane 308, along with projected target widths 325 and projected target heights 330 for angular rotations of the cylinder varying from −90 to +90 degrees.

The resultant beam spot 306 is trapezoidal in shape, in one embodiment. The greater the height of the trapezoidal spot and the narrower the width of the trapezoidal spot, the higher the resolution. Since the flying spot beam travels vertically, having a height that is longer in the flying direction yields better scan performance. This is because in "aggregating" the flying beam spot projections, taller adjacent beam spots will be closer to one another and overlap, thus creating a continuous scan line at a higher energy, with better resolution, resulting in a higher resolution image. In addition, the smaller the resultant flying spot, the greater the power, because it is more focused.

Figure 3C:
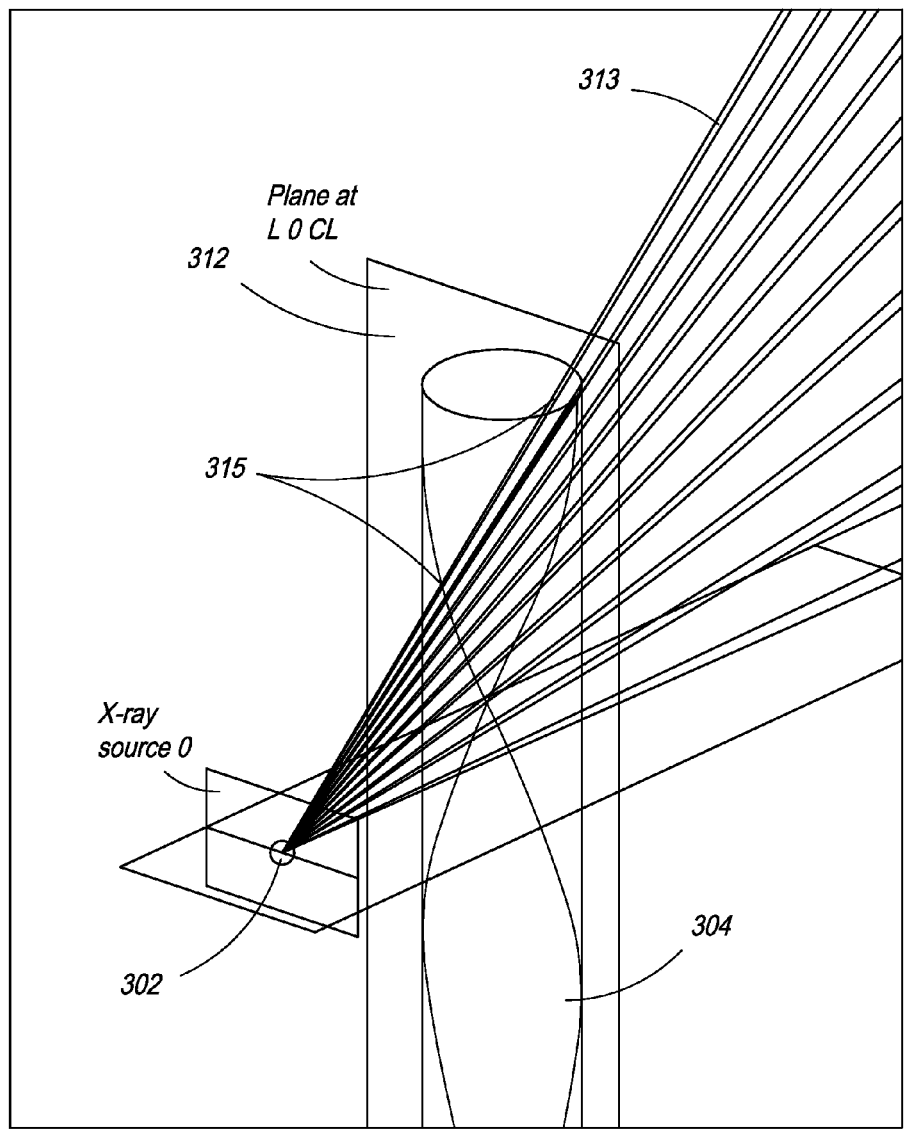
FIG. 3C illustrates a view of the X-ray beam projection at the center line of the vertical spin-roll chopper plane, showing the X-ray beam passing through two helical apertures when the X-ray beam traverses from the source at the 45 degree position.

FIG. 3C illustrates a view of the X-ray beam projection at the center line of the vertical spin-roll chopper plane 312, showing the X-ray beam 313 passing through two helical apertures 315 on spin-roll chopper 304 when the X-ray beam traverses from source 302 is at the 45 degree position.

Figure 3D:
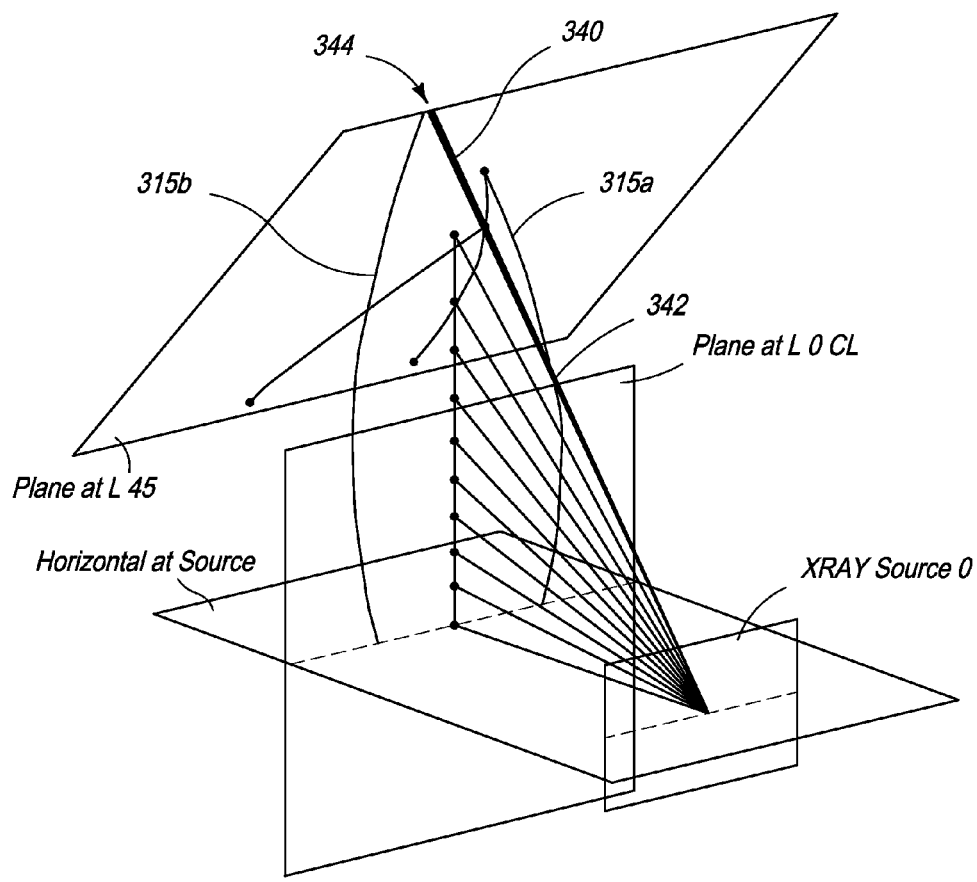
FIG. 3D illustrates the X-ray beam projection at the center line of the vertical spin roll chopper plane as the radiation beam passes through the two helical slits of the spin-roll chopper, illustrating empirical data at five degree increments of a total scanning beam traversal of +45 degrees and spin-roll chopper rotation of −90 to +90 degrees.

FIG. 3D illustrates the X-ray beam projection at the center line of the vertical spin roll chopper plane as the radiation beam passes through the two helical slits of the spin-roll chopper, illustrating empirical data at five degree increments of a total scanning beam traversal of +45 degrees and spin-roll chopper rotation of −90 to +90 degrees. As shown in FIG. 3D, the beam 340 will pass through a first aperture point 342 on the spin-roll chopper helical aperture 315a and then propagate through a second aperture point 344 on the spin-roll chopper helical aperture 315b.

The spin-roll chopper of the present invention provides a vertically moving beam spot with substantially constant velocity to allow for equal illumination of the target, unlike the prior art spinning disc chopper wheel. Thus, the spin roll chopper of the present invention moves and projects the beam spot substantially precisely and at a substantially constant speed. Also, the spin roll allows for the beam to be substantially equal in size at all points on the object. Thus, the radiation is a function of power and distance and using the spin roll the speed of the beam can be controlled precisely for even power distribution of the flying beam (such that power and distance are equal at all points). Again, using the spin roll chopper of the present invention attenuation to the shape of the scanning beam can be provided such that it will change the shape with the axis of the scanning beam itself. The distinctions between a conventional chopper wheel and the spin roll chopper of the present invention are described with respect to FIGS. 4A, 4B, 4C, 5A, 5B, 6A, 6B, 7A, 7B, 8A, 8B, 9A, and 9B.

Figures 4A, 4B:
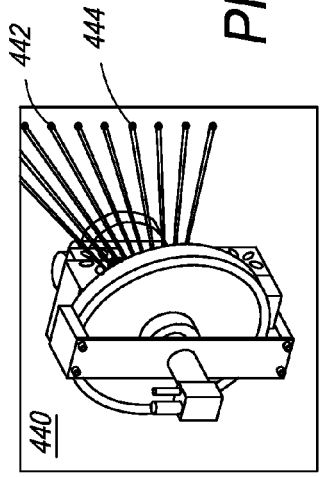
FIG. 4A is a table providing empirical data for a plurality of beam spot/target parameters obtained using a prior art disc wheel chopper, where data is provided at five degree increments of a total scanning beam traversal of −45 to +45 degrees.
FIG. 4B illustrates the resultant beam projection from using a prior art chopper wheel, showing that the width of the beam and size of the resultant spot vary across the scan.
Figure 4E:
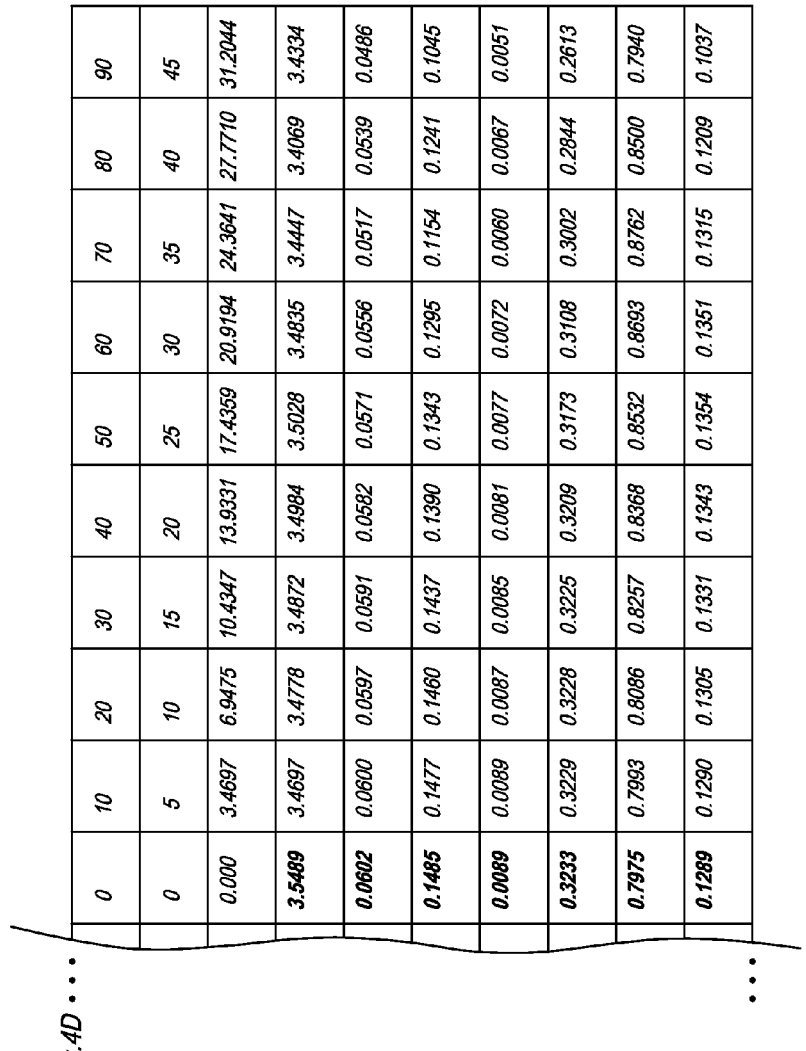
FIG. 4C is a table providing empirical data for a plurality of beam spot/target parameters obtained using the spin-roll chopper of the present invention, where data is provided at five degree increments of a total scanning beam traversal of −45 to +45 degrees and a spin-roll chopper rotation of −90 to +90 degrees.

FIG. 4A is a table providing empirical data for a plurality of beam spot/target parameters obtained using a prior art disc wheel chopper, where data is provided at five degree increments of a total scanning beam traversal of −45 to +45 degrees. FIG. 4A shows variations of a plurality of parameters for various angular displacements 405 of the source and thus, beam, such as but not limited to linear displacement 410 in the scan plane (representing a slice somewhere along the length of the distance from source to target); scan displacement 415 between points (where the points are flying spots arbitrarily chosen to provide empirical data); projected width 420; projected target height 425; and projected target size 430, all of which are described in greater detail below.

FIG. 4B illustrates the resultant beam projection from using a prior art chopper wheel 440, showing that the width of the beam 442 and size of the resultant spot 444 vary across the scan. Persons of ordinary skill in the art would appreciate that a conventional chopper wheel comprises four slits, each one at 90 degrees from the other on the periphery of the flange. It is not realistic, however, to assume that these slits will be manufactured and cut at exactly 90 degrees. Thus, when the chopper wheel is rotated, not only is there a skew due to the inexact nature of these slits, but a skew due to the beam size depending on the distance of the slit and thus beam from the center of the chopper wheel as described above. In addition, on the prior art chopper wheel, the size of the slit cannot be easily manipulated as there is only one opening at each point and not a continuous slit. This results in the flying spot to be at distinct and uneven distances from each point on the chopper wheel.

FIG. 4C is a table providing empirical data for a plurality of beam spot/target parameters obtained using the spin-roll chopper of the present invention, where data is provided at five degree increments of a total scanning beam traversal of −45 to +45 degrees and a spin-roll chopper rotation of −90 to +90 degrees. Thus, FIG. 4C shows variations of a plurality of parameters for various angular rotations 450 of the spin-roll chopper of the present invention and various angular displacements 452 of the source and thus, resultant beam, such as, but not limited to linear displacement 454 in the scan plane (representing a slice somewhere along the length of the distance from source to target, and in this case 18 inches); scan displacement 456 between points (where the points are flying spots arbitrarily chosen to provide empirical data); spot size width 458 at the vertical plane located at the center line of the spin-roll chopper and along the z-axis; spot size height 460 at the vertical plane located at the center line of the spin-roll chopper and along the z-axis; spot size area 462 (in square inches) at the vertical plane of the center line of the spin-roll chopper and along the z-axis; projected target width 464 across the x-axis vertical plane of the center line of the spin-roll chopper and along the z-axis; projected target height 466 along the z-axis at the vertical plane of the center line of the spin-roll chopper and along the z-axis; and projected target size 468, vertical plane of the center line of the spin-roll chopper and along the z-axis, all of which are described in greater detail below.

Figure 5A:
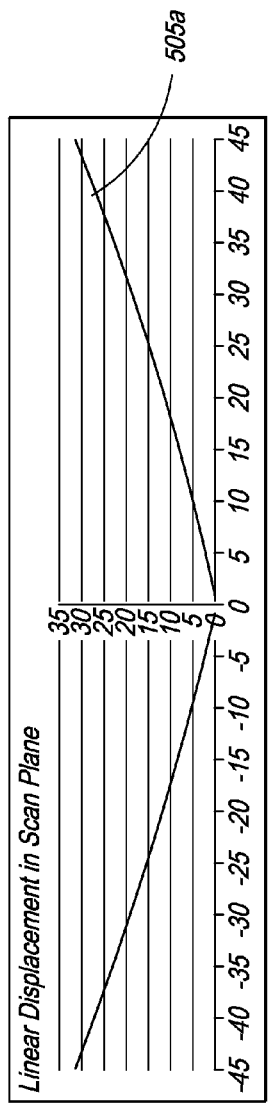
FIG. 5A is a graphical illustration of the variation of the linear displacement of the beam spot, in the scan plane, using the prior art disc wheel chopper, where data is provided for a total scanning beam traversal of −45 to +45 degrees.
Figure 5B:
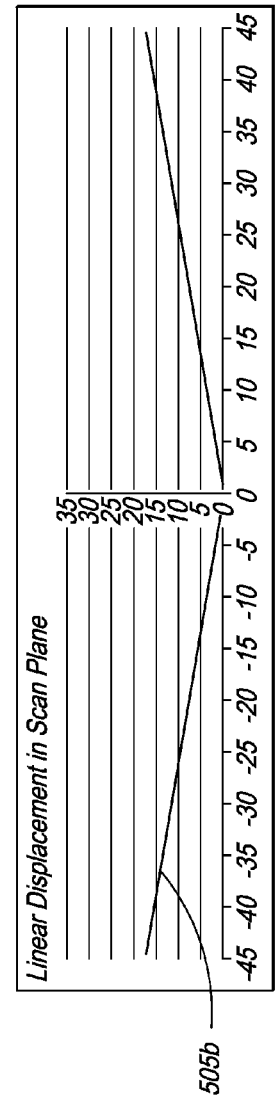
FIG. 5B is a graphical illustration of the variation of the linear displacement of the beam spot, in the scan plane, using the spin-roll chopper of the present invention, where data is provided for a total scanning beam traversal of −45 to +45 degrees and a spin-roll chopper rotation of −90 to +90 degrees.

FIG. 5A is a graphical illustration of the variation of the linear displacement of the beam spot, in the scan plane, using the prior art disc wheel chopper, where data is provided for a total scanning beam traversal of −45 to +45 degrees. It has been found that these spots track in patterns of four, representing the four slits in the wheel. FIG. 5A shows a graph wherein the beam spots have variable linear displacement 505a of spots in the scan plane for the chopper wheel as compared to linear displacement 505b for the spin-roll chopper shown in FIG. 5B. FIG. 5B is a graphical illustration of the variation of the linear displacement of the beam spot, in the scan plane, using the spin-roll chopper of the present invention, where data is provided for a total scanning beam traversal of −45 to +45 degrees and a spin-roll chopper rotation of −90 to +90 degrees. The resolution depends on how the chopper wheel is spun and at what velocity, as described in detail above. The faster the chopping mechanism is spun, the smaller the variance in frequency. The spin-roll chopper of the present invention can be spun at RPMs up to 80K.

Figure 6A:
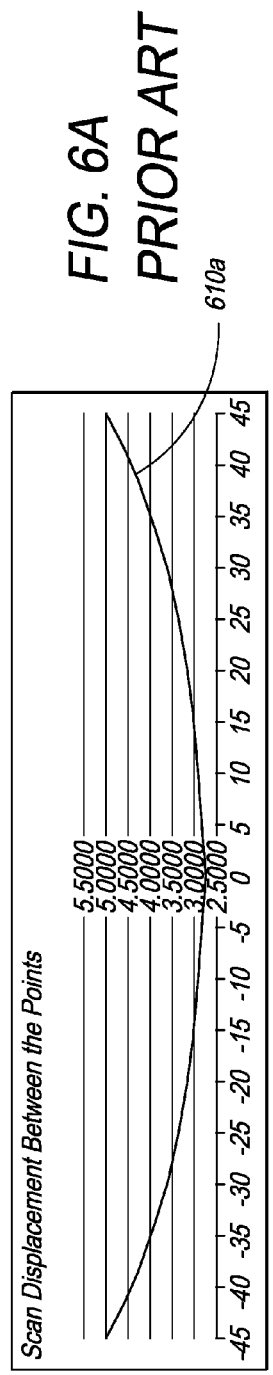
FIG. 6A is a graphical illustration of the variation of scan displacement of the beam spot using the prior art disc wheel chopper, where data is provided for a total scanning beam traversal of −45 to +45 degrees.

FIG. 6A is a graphical illustration of the variation of scan displacement of the beam spot using the prior art disc wheel chopper, where data is provided for a total scanning beam traversal of −45 to +45 degrees, showing that the scan displacement 610a between points is skewed for the chopper wheel.

Figure 6B:
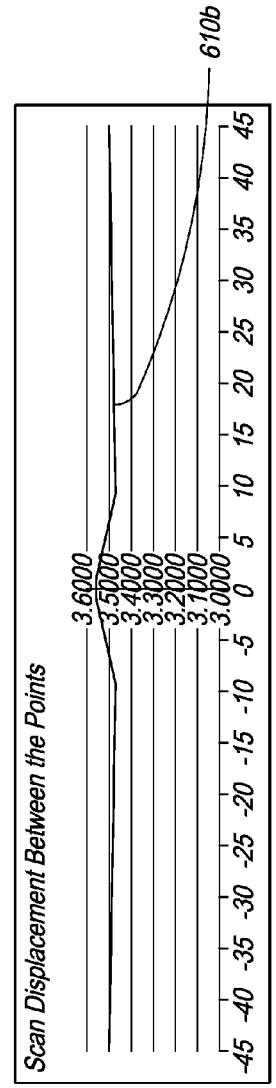
FIG. 6B is a graphical illustration of the variation of scan displacement of the beam spot using the spin-roll chopper of the present invention, where data is provided for a total scanning beam traversal of −45 to +45 degrees and a spin-roll chopper rotation of −90 to +90 degrees.

FIG. 6B is a graphical illustration of the variation of scan displacement of the beam spot using the spin-roll chopper of the present invention, where data is provided for a total scanning beam traversal of −45 to +45 degrees and a spin-roll chopper rotation of −90 to +90 degrees, showing, however, that the scan displacement 610b is substantially straight for the spin roll chopper as shown in FIG. 6B. This is because in the spin-roll chopper of the present invention there are two helical slits that overlap at every 180 degrees. Thus, the radiation beam has two slits to run through such that at one point in time, the X-rays will pass through both slits to create the beam spot. This is referred to as dual collimation and also prevents frequency deviation thereby keeping the frequency substantially constant. Since the slits in the spin roll are continuous, there is less error in the "distance between slits", while with the chopper wheel it is, in practice, quite difficult to get the slits at exactly 90 degrees from one another.

In accordance with an embodiment of the present invention, at certain distances from the center of the beam, the helical slit (of the spin roll chopper) is kept wider than others. FIG. 10 shows a mathematical expression of the trajectory 1005 of the beam using a single source, in accordance with one embodiment. In order to get the dimensions of the helical cuts in the spin-roll cylinder, one dimension of this trajectory was removed. More specifically, the slit is narrower at the top 1010 because there is a greater distance for the beam to travel. Note that when an X-ray beam travels through any opening, the beam is collimated. The farther the beam travels, the wider the resultant "spot" (fan beam) is at the end of the beam. By making the slit narrower at the top 1010, this greater distance and beam widening is accounted for. In addition, the slit is made wider where the distance to the object is shorter, such as at point 1015. Also, persons of ordinary skill in the art should appreciate that by controlling the size of the slit one can control the density of the beam that is projected straight through.

Figure 7A:
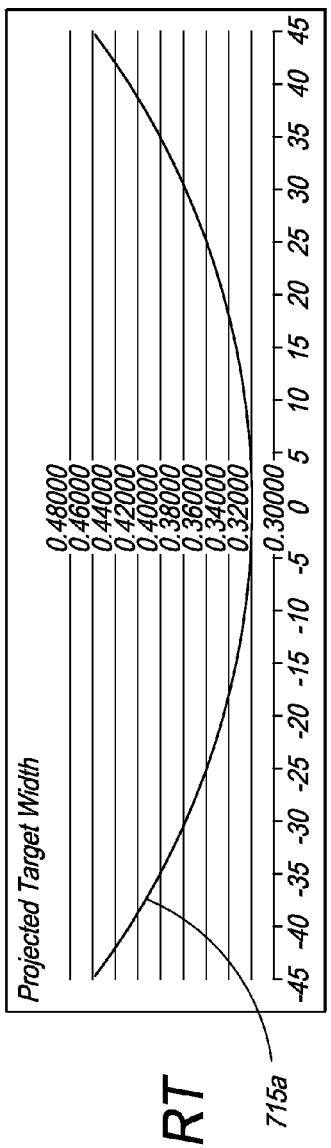
FIG. 7A is a graphical illustration of the variation of projected target/beam spot width using the prior art disc wheel chopper, where data is provided for a total scanning beam traversal of −45 to +45 degrees.
Figure 7B:
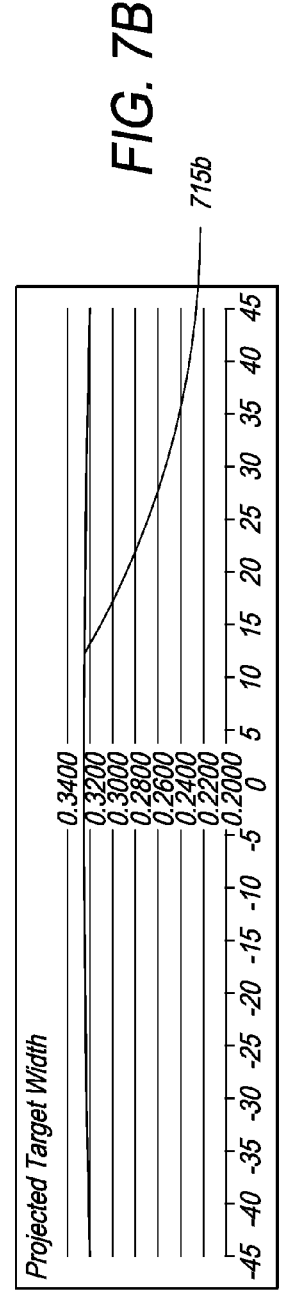
FIG. 7B is a graphical illustration of the variation of projected target/beam spot width using the spin-roll chopper of the present invention, where data is provided for a total scanning beam traversal of −45 to +45 degrees and a spin-roll chopper rotation of −90 to +90 degrees.

FIG. 7A shows a graphical illustration of the variation of projected target/beam spot width using the prior art disc wheel chopper, where data is provided for a total scanning beam traversal of −45 to +45 degrees, while FIG. 7B is a graphical illustration of the variation of projected target/beam spot width using the spin-roll chopper of the present invention, where data is provided for a total scanning beam traversal of −45 to +45 degrees and a spin-roll chopper rotation of −90 to +90 degrees. FIG. 7B shows that, for the spin-roll, there is equal resultant beam/spot width 715b throughout, because the slit is wider at shorter distances from the object (under inspection) and narrower at longer distances from the object to compensate for this distance (−90 degrees to +90 degrees)—as compared to the relatively varying beam/spot width 715a for the chopper wheel as shown in FIG. 7A.

Figure 8A:
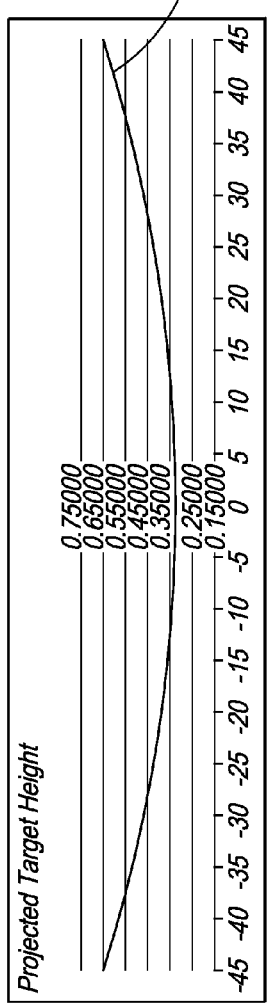
FIG. 8A is a graphical illustration of the variation of projected target/beam spot height using the prior art disc wheel chopper, where data is provided for a total scanning beam traversal of −45 to +45 degrees.
Figure 8B:
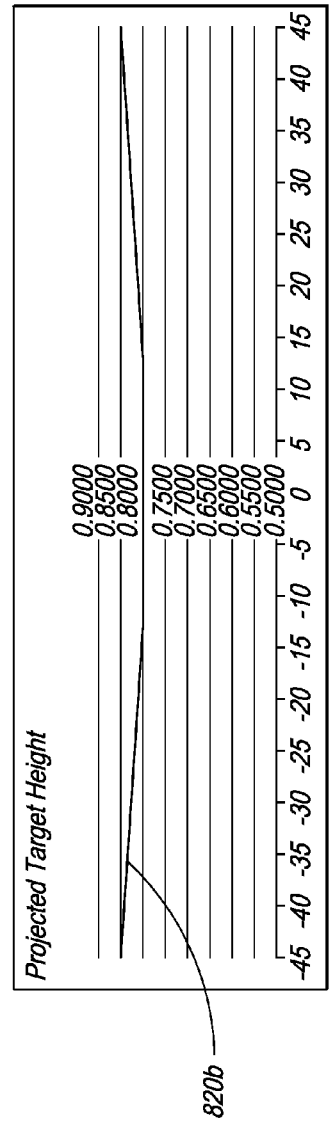
FIG. 8B is a graphical illustration of the variation of projected target/beam spot height using the spin-roll chopper of the present invention, where data is provided for a total scanning beam traversal of −45 to +45 degrees and a spin-roll chopper rotation of −90 to +90 degrees.

FIG. 8A is a graphical illustration of the variation of the projected target/beam spot height using the prior art disc wheel chopper, where data is provided for a total scanning beam traversal of −45 to +45 degrees, while FIG. 8B is a graphical illustration of the variation of projected target/beam spot height using the spin-roll chopper of the present invention, where data is provided for a total scanning beam traversal of −45 to +45 degrees and a spin-roll chopper rotation of −90 to +90 degrees. Thus, FIG. 8A shows that for the chopper wheel the projected target height 820a varies significantly when compared to the projected target height 820b, in FIG. 8B, for the spin-roll.

FIG. 9A is a graphical illustration of the variation of projected target/beam spot size using the prior art disc wheel chopper, where data is provided for a total scanning beam traversal of −45 to +45 degrees, while FIG. 9B is a graphical illustration of the variation of projected target/beam spot size using the spin-roll chopper of the present invention, where data is provided for a total scanning beam traversal of −45 to +45 degrees and a spin-roll chopper rotation of −90 to +90 degrees. Again, as shown in FIG. 9A the projected target size 925a for the chopper wheel varies significantly as compared to the projected target size 925b of the spin-roll as shown in FIG. 9B.

Figure 11:
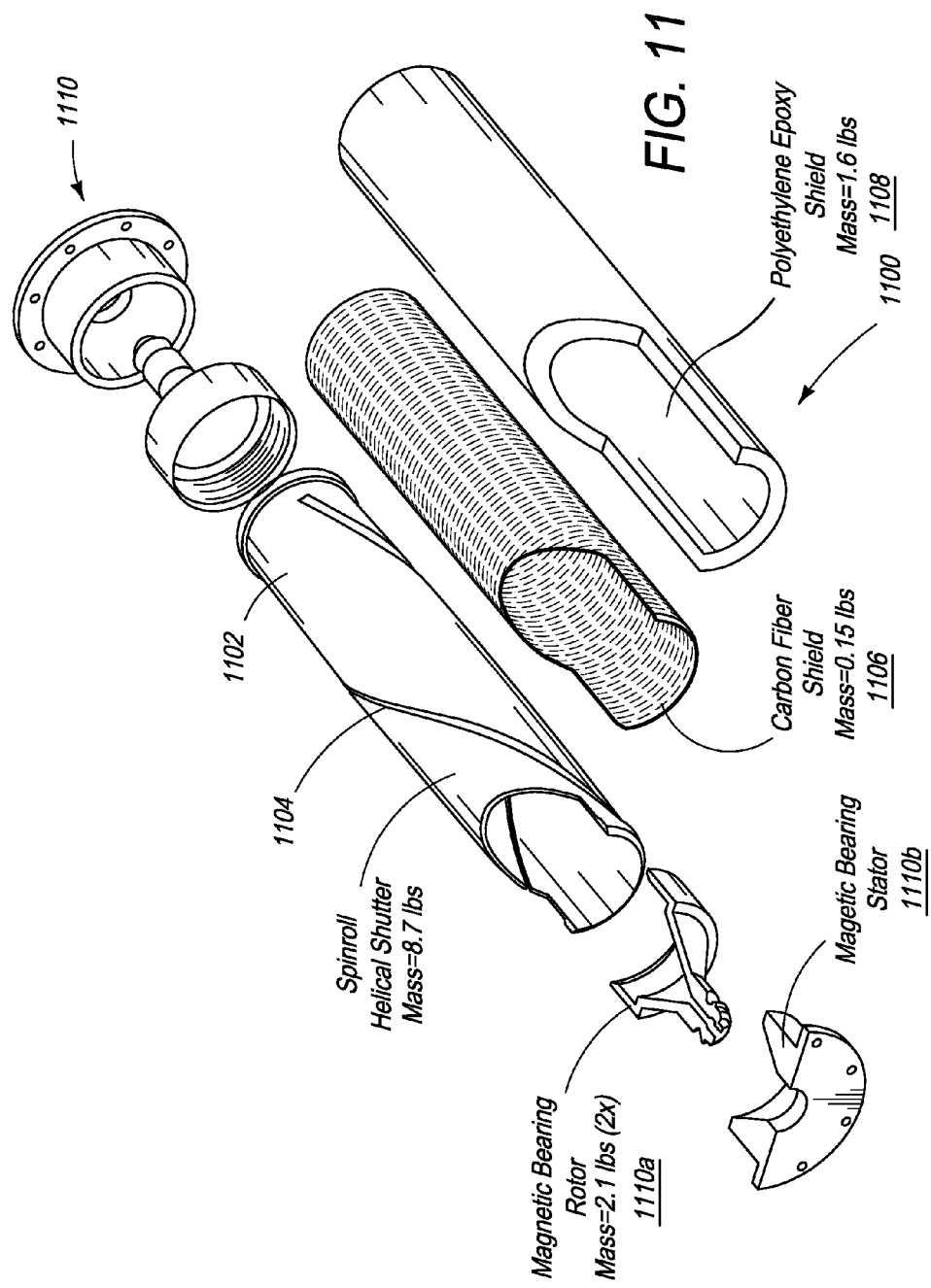
FIG. 11 illustrates a component design of the spin-roll chopper, in accordance with an embodiment of the present invention.

FIG. 11 illustrates the design and fabrication of the spin-roll chopper, in accordance with an embodiment of the present invention. As illustrated, a hollow tungsten cylinder 1102 machined with helical slits 1104 forms the inner layer of spin-roll chopper assembly 1100. The cylinder 1102 is formed from one or two pieces of tungsten formed together. Since tungsten is opaque to ionizing radiation, an X-ray beam will not pass through it. A carbon fiber fabric 1106 (such as, but not limited to Kevlar) is wrapped around the tungsten cylinder 1102. The carbon fiber is transparent to the X-ray beams and thus, creates a window (moving aperture) through which the beam passes in the shape of the helical slits cut out of the tungsten cylinder 1102.

Further, in one embodiment, an epoxy shield 1108, such as a polyethylene epoxy shield is used to bind the carbon fiber 1106 to the tungsten cylinder 1102. The epoxy shield also creates a window (moving aperture) through which the beams pass in the shape of the helical slits cut out of the tungsten. The epoxy shield prevents unraveling of the carbon fiber cover.

In a first embodiment, the cylinder is machine spun and fabricated from brass.

In one embodiment, in order to form the epoxy shield around the carbon fiber coated tungsten cylinder, a chemical setting technique is employed whereby at least two liquid components are mixed together and upon mixing, the chemical components form a solid epoxy coating. In one embodiment, the solid epoxy coating formed is a polyethylene epoxy.

In one embodiment, in order to form the epoxy shield around the carbon fiber coated tungsten cylinder, a thermal setting technique is employed whereby the cylinder is placed into a spinning and heated epoxy powder mold (at say, 400 degrees C.) which is heated to the melting point to create a light structure with tungsten and Kevlar inside. In one embodiment, the epoxy shield 1108 has sufficient hardness, strength, and durability to withstand centrifugal forces of up to 80K RPM.

In one embodiment, the spin roll chopper assembly 1100 is dynamically controlled for rotation using an electromagnetic motor drive.

In one embodiment, the light-weight chopper assembly 1100 is spun using a magnetic bearing assembly 1110, which eliminates the need for a motor to spin the chopper, thereby contributing to keeping the chopper assembly further lightweight. The magnetic bearing assembly 1110 comprises a magnetic rotor 1110a, and a magnetic bearing stator 1110b. Besides a spinning motion, the magnetic bearing assembly 1110 is also used to provide magnetic levitation for the chopper during power-up (ON state) and power-down (OFF state), as well as during accidental power-failure.

Depending upon the material of the cylinder 1102 and the bearings used to support the rolling movement of the chopper, various ranges of RPMs are achievable. For example, a bare cylinder 1102 fabricated from brass with diamond bearings can be spun to achieve up to 1K RPMs; a bare cylinder 1102 fabricated from tungsten with diamond bearings can achieve up to 4K RPM; while a bare cylinder 1102 fabricated from tungsten and coated with Kevlar and epoxy and spun using diamond bearings can achieve up to 80 K RPM.

Figure 12:
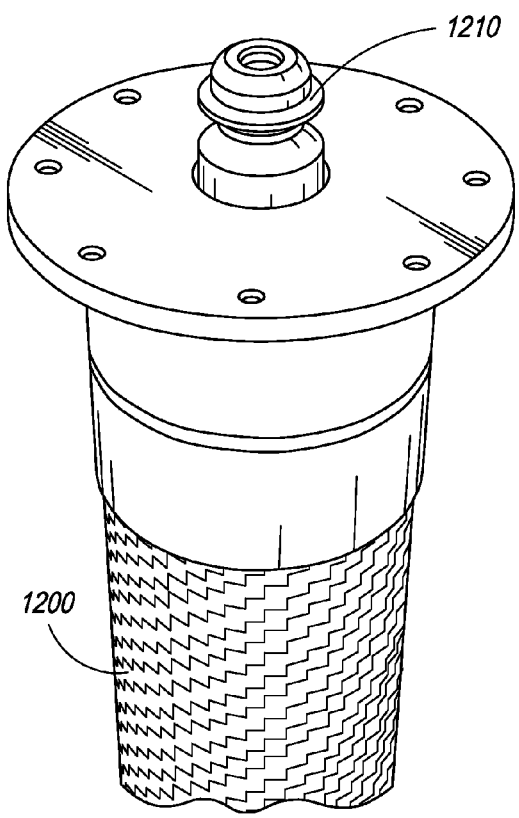
FIG. 12 illustrates an assembled spin-roll chopper, equipped with a magnetic bearing assembly in accordance with an embodiment of the present invention.

FIG. 12 illustrates the assembled spin roll chopper cylinder 1200, along with the magnetic bearing assembly 1210.

Persons of ordinary skill in the art would appreciate that magnetic bearings support the rolling motion of the spin-roll chopper without physical contact and permit relative motion with very low friction and no mechanical wear. In one embodiment, referring back to FIG. 11, the space between the rotor 1110a and the stator 1110b is filled with an inert gas, such as Argon, to suspend the spin roll in space and enable higher RPMs.

A magnetic bearing works on the principle of electromagnetic suspension and in one embodiment comprises an electromagnet assembly, a set of power amplifiers which supply current to the electromagnets, a controller, and gap sensors with associated electronics to provide the feedback required to control the position of the rotor within the gap. The power amplifiers supply equal bias current to two pairs of electromagnets on opposite sides of a rotor. This constant tug-of-war is mediated by the controller which offsets the bias current by equal but opposite perturbations of current as the rotor deviates by a small amount from its center position. The gap sensors are usually inductive in nature and sense in a differential mode. The power amplifiers in one embodiment are solid state devices which operate in a pulse width modulation (PWM) configuration. The controller is a microprocessor or DSP.

It should be appreciated that since the spin-roll chopper of the present invention can be spun very fast, it is possible to use the chopper with multiple X-ray beams. In one embodiment, four beams are used, with four separate corresponding detector panels to determine which beam is active.

The present invention provides that the distance of the spin-roll chopper is directly correlated with a minimum scan height. This allows for longer distance from source to the target, thereby extending the depth of field with respect to dose rate. Therefore, for a given depth of imaging, a smaller radiation dose is required in a threat detection system employing the spin-roll chopper of the present invention, as compared to other systems known in the art. In one embodiment, due to the kinematics and resultant moment of inertia of the spin-roll chopper of the present invention, it is insensitive to orientation.

In an exemplary embodiment, the spin-roll chopper is employed in a detection system which is implemented as a walk-through detection system. The novel design of the spin-roll chopper enables utilization of low-level radiation doses to detect weapons and dangerous materials, regardless of whether they consist of metal or low Z materials. Besides being employed for screening of passengers at airports and railway stations, at open and crowded venues such as stadiums and shopping malls, applications of the spin-roll chopper of present invention may be extended detection systems for inspecting the contents of vehicles and containers at transit points such as ports, border crossings and customs checkpoints, and other secure locations.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive.

What is claimed is:

1. An X-ray apparatus comprising:
an X-ray source for emitting X-ray radiation; and
a beam chopping apparatus coupled to said X-ray source, wherein said beam chopping apparatus is adapted to receive said X-ray radiation and form a moving beam spot having a frequency, wherein said beam frequency is substantially constant and wherein said beam chopping apparatus comprises a hollow cylinder having at least one helical aperture.

2. The X-ray apparatus of claim 1 further comprising a motor for rotating said cylinder.

3. The X-ray apparatus of claim 2 further comprising a controller for dynamically modifying a rotation speed of said cylinder to achieve a predetermined scan velocity.

4. The X-ray apparatus of claim 3 wherein said rotation speed is equal to or less than 80,000 rpm.

5. The X-ray apparatus of claim 2 wherein said beam has a scan velocity and a spot size and wherein scan velocity and spot size can be modified without varying a speed of said motor.

6. An X-ray apparatus comprising:
an X-ray source for emitting X-ray radiation; and
a beam chopping apparatus coupled to said X-ray source, wherein said beam chopping apparatus is adapted to receive said X-ray radiation and form a moving beam spot having a frequency, wherein said beam frequency is substantially constant and wherein said beam chopping apparatus comprises a hollow cylinder having at least two helical apertures.

7. The X-ray apparatus of claim 6 wherein said beam has a linear scan velocity and wherein said linear scan velocity is varied by modifying a pitch and roll of at least one of said helical apertures.

8. The X-ray apparatus of claim 6 wherein said beam has a linear scan velocity and wherein said linear scan velocity is kept constant by modifying a pitch and roll of at least one of said helical apertures.

9. The X-ray apparatus of claim 6 wherein said beam has a spot size and wherein said spot size is varied by modifying an aperture width of at least one of said helical apertures.

10. The X-ray apparatus of claim 6 wherein said beam has a spot size and wherein said spot size is kept constant by modifying an aperture width of at least one of said helical apertures.

11. An X-ray apparatus comprising:
an X-ray source for emitting X-ray radiation; and
a beam chopping apparatus coupled to said X-ray source, wherein said beam chopping apparatus is adapted to receive said X-ray radiation and form a moving beam spot having a frequency, wherein said beam frequency is substantially constant and wherein said beam chopping apparatus comprises a hollow cylinder having at least two helical apertures, each having a length and an aperture width along said length and wherein said aperture width narrows along length.

12. An X-ray apparatus comprising:
an X-ray source for emitting X-ray radiation; and
a beam chopping apparatus coupled to said X-ray source, wherein said beam chopping apparatus is adapted to receive said X-ray radiation and form a moving beam spot having a frequency, wherein said beam frequency is substantially constant and wherein said beam chopping apparatus comprises a hollow cylinder having at least two helical apertures, each having a length and an aperture width along said length and wherein said aperture width increases along the length.

13. An X-ray apparatus comprising:
An X-ray source for emitting X-ray radiation; and
A beam chopping apparatus coupled to said X-ray source, wherein said beam chopping apparatus comprises a hollow cylinder with a first end and a second end defining a length of said cylinder and at least one helical aperture extending substantially along said length, wherein said cylinder is adapted to receive said X-ray radiation and emit said X-ray radiation through said helical aperture.

14. The X-ray apparatus of claim 13 wherein said X-ray radiation passes through the helical aperture to produce a beam spot projection pattern, wherein said beam spot projection pattern comprises a beam spot moving vertically with a substantially constant velocity in a plane perpendicular to a plane of the X-ray source.

15. The X-ray apparatus of claim 14 wherein said beam spot projection pattern comprises a beam spot moving vertically with a substantially constant velocity in a plane parallel to a plane of the beam chopping apparatus.

16. The X-ray apparatus of claim 15 wherein said beam spot provides substantially equal illumination of a target object.

17. The X-ray apparatus of claim 13 wherein said beam spot is trapezoidal.

18. The X-ray apparatus of claim 13 wherein said helical aperture has a width that is more narrow at the second end relative to said first end.

* * * * *